United States Patent
Sorrentino et al.

(10) Patent No.: US 9,961,685 B2
(45) Date of Patent: May 1, 2018

(54) PROGRESSIVE RESOURCE ALLOCATION FOR VEHICULAR COMMUNICATION

(71) Applicant: Telefonaktiebolaget L M Ericsson (publ), Stockholm (SE)

(72) Inventors: Stefano Sorrentino, Solna (SE); Hieu Do, Solna (SE); Ricardo Blasco Serrano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 14/703,124

(22) Filed: May 4, 2015

(65) Prior Publication Data

US 2016/0330728 A1 Nov. 10, 2016

(51) Int. Cl.
*H04W 72/04* (2009.01)

(52) U.S. Cl.
CPC ................................. *H04W 72/048* (2013.01)

(58) Field of Classification Search
CPC ....... H04W 4/00; H04W 4/027; H04W 72/00; H04W 72/02; H04W 72/04; H04W 72/12; H04W 72/1263; H04W 72/14; H04W 72/048

See application file for complete search history.

(56) References Cited

U.S. PATENT DOCUMENTS

| | | | | |
|---|---|---|---|---|
| 8,005,052 B2 * | 8/2011 | Hayashi | ................ | H04W 72/04 370/337 |
| 8,355,387 B2 * | 1/2013 | Qin | .................... | H04N 21/2381 370/336 |
| 8,891,451 B2 * | 11/2014 | Shao | ..................... | H04W 72/02 370/328 |
| 9,215,693 B2 * | 12/2015 | Ahn | ....................... | H04W 72/04 |
| 9,363,827 B2 * | 6/2016 | Li | ........................ | H04W 74/004 |
| 9,474,095 B2 * | 10/2016 | Schmidt | ............. | H04W 76/023 |

(Continued)

FOREIGN PATENT DOCUMENTS

| | | |
|---|---|---|
| WO | WO 2014/072933 A1 | 5/2014 |
| WO | WO 2015/140274 A1 | 9/2015 |

OTHER PUBLICATIONS

3GPP TSG RAN WG1 Meeting #82bis, R1-155909, Malmö, Sweden, Source: Ericsson, Title: "*Discussion on V2V Scheduling, Resource Pools and Resource Patterns*", Agenda Item 7.2.8.2.1, 6 pages, Oct. 4-10, 2015.

(Continued)

*Primary Examiner* — Hassan Kizou
*Assistant Examiner* — Roberta A Shand
(74) *Attorney, Agent, or Firm* — Baker Botts, LLP

(57) ABSTRACT

A method in a network node is disclosed. The method comprises allocating a pool of radio resources for vehicle-to-other (V2x) communication by a plurality of wireless devices, and dividing the allocated pool of radio resources for V2x communication into a plurality of orthogonal sets of radio resources, each set of radio resources having an associated set identifier comprising one of a plurality of positive integers. The method further comprises assigning one or more radio resource sets to each wireless device among the plurality of wireless devices based at least in part on a radio-compatibility characteristic, and communicating to each wireless device the assigned set of radio resources to use.

40 Claims, 16 Drawing Sheets

(56) References Cited

U.S. PATENT DOCUMENTS

2015/0024763 A1    1/2015   Lee et al.

OTHER PUBLICATIONS

3GPP TSG RAN WG1 Meeting #84bis, R1-162336, Busan, Korea, Source: OPPO, Title: "*Discussion on the mode-2 resource allocation for V2V*", Agenda Item 7.3.2.2.2, 6 pages, Apr. 11-15, 2016.

3GPP TSG RAN WG1 Meeting #84bis, R1-163128, Busan, Korea, Source: CATR, Title: "*Resource allocation and selection enhancement for V2V communications*", Agenda Item 7.3.2.2.1, 4 pages, Apr. 11-15, 2016.

3GPP TSG RAN WG1 Meeting #84, R1-160678, St. Julian's, Malta, Source: Sony, Title: "*Location based resource selection on LTE sidelink for V2V services*", Agenda Item 7.3.2.2.1, 3 pages, Feb. 15-19, 2016.

PCT Notification of Transmittal of the International Search Report and the Written Opinion of the International Searching Authority, or the Declaration, International Application No. PCT/IB2016/052494, 18 pages, Jul. 19, 2016.

\* cited by examiner

PROGRESSIVE RESOURCE ALLOCATION FOR VEHICULAR COMMUNICATION

TECHNICAL FIELD

The present disclosure relates, in general, to wireless communications, and, more particularly, to progressive resource allocation for vehicular communication.

BACKGROUND

During Release 12, the LTE standard has been extended with support of device-to-device (D2D) (specified as "sidelink") features targeting both commercial and Public Safety applications. An example application enabled by Rel-12 LTE is device discovery, where devices are able to sense the proximity of another device and associated application by broadcasting and detecting discovery messages that carry device and application identities. Another example application is direct communication based on physical channels terminated directly between devices.

One of the potential extensions for the device to device work consists of support of vehicle-to-anything-you-can-imagine (V2x) communication, which includes any combination of direct communication between vehicles, pedestrians and infrastructure. V2x communication may take advantage of a network infrastructure, when available, but at least basic V2x connectivity should be possible even in case of lack of coverage. Providing an LTE-based V2x interface may be economically advantageous because of the LTE economies of scale, and it may enable tighter integration between communications with the network infrastructure (V2I), vehicle-to-pedestrian (V2P) communications, and vehicle-to-vehicle (V2V) communications, as compared to using a dedicated V2x technology.

V2x communications may carry both non-safety and safety information, where each of the applications and services may be associated with specific requirements sets, e.g., in terms of latency, reliability, capacity, etc. ETSI has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM messages also serve as active assistance to safety driving for normal traffic. The availability of a CAM message is indicatively checked for every 100 ms, yielding a maximum detection latency requirement of less than or equal to 100 ms for most messages. However, the latency requirement for a pre-crash sensing warning is 50 ms.

The DENM message is event-triggered, such as by braking, and the availability of a DENM message is also checked for every 100 ms. The requirement of maximum latency is less than or equal to 100 ms.

The package size of CAM and DENM messages varies from 100+ to 800+ bytes, and the typical size is around 300 bytes. The message is supposed to be detected by all vehicles in proximity.

The SAE (Society of the Automotive Engineers) also defined the Basic Safety Message (BSM) for Dedicated Short Range Communications (DSRC), with various messages sizes defined. According to the importance and urgency of the messages, the BSMs are further classified into different priorities.

The geographical distribution of V2x communication follows the distribution of the road infrastructure, which may not coincide with that of the telecommunications infrastructure (e.g., the cells). Consequently, V2x traffic may be unevenly spread over each network cell. Existing distributed resource allocation algorithms for V2x applications yield a low degree of spatial reutilization, which precludes the redeployment of unused resources for other applications. Thus, there is a need for an improved resource allocation scheme.

SUMMARY

To address the foregoing problems with existing solutions, disclosed is a method in a network node. The method comprises allocating a pool of radio resources for vehicle-to-other (V2x) communication by a plurality of wireless devices, and dividing the allocated pool of radio resources for V2x communication into a plurality of orthogonal sets of radio resources, each set of radio resources having an associated set identifier comprising one of a plurality of positive integers. The method further comprises assigning one or more radio resource sets to each wireless device among the plurality of wireless devices based at least in part on a radio-compatibility characteristic, and communicating to each wireless device the assigned set of radio resources to use.

The radio-compatibility characteristic may comprise one or more of a distance measurement and a direct radio measurement between wireless devices. In certain embodiments, the method may further comprise configuring the plurality of wireless devices to prioritize selection of radio resources belonging to radio resource sets having smaller associated set identifiers among the one or more assigned radio resource sets. The plurality of wireless devices may comprise a first group of wireless devices capable of communicating with each other using V2x communication, and a second group of wireless devices capable of communicating with each other using V2x communication. The first group of wireless devices may be unable to effectively communicate with the second group of wireless devices using V2x communication. Assigning one or more radio resource sets to each wireless device among the plurality of wireless devices based at least in part on a radio-compatibility characteristic may comprise assigning a first resource set to wireless devices in the first group, assigning the first resource set to wireless devices in the second group, and assigning different resource sets to other wireless devices that cause interference to wireless devices in the first or second groups.

In certain embodiments, each set of radio resources may include a single radio resource, and configuring the plurality of wireless devices to prioritize selection of radio resources belonging to radio resource sets having smaller associated set identifiers among the one or more assigned radio resource sets may comprise configuring the plurality of wireless devices to select a radio resource set having an available radio resource and a set identifier corresponding to the lowest positive integer number among the one or more assigned radio resource sets. In certain embodiments, each set of radio resources may include multiple radio resources, and configuring the plurality of wireless devices to prioritize selection of radio resources belonging to radio resource sets having smaller associated set identifiers among the one or more assigned radio resource sets may comprise configuring the plurality of wireless devices to select a set of radio resources having available radio resources and a set identifier corresponding to the lowest positive integer number among the one or more assigned radio resource sets, and select a radio resource from the selected set of radio resources.

In certain embodiments, the radio resource set may be selected from a subset of the plurality of radio resource sets having an associated set identifier smaller than a defined number. Assigning one or more radio resource sets to each wireless device among the plurality of wireless devices based at least in part on a radio-compatibility characteristic may further comprise assigning one or more radio resource sets to each wireless device among the plurality of wireless devices based at least in part on one or more radio measurements performed by a wireless device.

In certain embodiments, allocating the pool of radio resources for V2x communication may comprise allocating a predefined pool of radio resources for V2x communication, the predefined pool of radio resources known to the plurality of wireless devices. Allocating the pool of radio resources for V2x communication may comprise dynamically allocating a pool of radio resources for V2x communication, and the method may further comprise broadcasting information about the allocated pool of radio resources for V2x communication to the plurality of wireless devices. Allocating the pool of radio resources for V2x communication may comprise allocating a predefined pool of radio resources known for V2x communication to the plurality of wireless devices, dynamically allocating a pool of radio resources for V2x communication, and broadcasting information about the dynamically allocated pool of radio resources for V2x communication to the plurality of wireless devices.

In certain embodiments, the method may further comprise receiving one or more reports on utilization of the radio resources allocated for V2x communication. The method may further comprise reallocating radio resources based on the one or more received reports on utilization of the radio resources allocated for V2x communication. The method may further comprise reutilizing unused radio resources of the allocated pool of radio resources for V2x communication for one or more other applications.

Also disclosed is a network node. The network node comprises one or more processors. The one or more processors are configured to allocate a pool of radio resources for vehicle-to-other (V2x) communication by a plurality of wireless devices, and divide the allocated pool of radio resources for V2x communication into a plurality of orthogonal sets of radio resources, each set of radio resources having an associated set identifier comprising one of a plurality of positive integers. The one or more processors are configured to assign one or more radio resource sets to each wireless device among the plurality of wireless devices based at least in part on a radio-compatibility characteristic, and communicate to each wireless device the assigned set of radio resources to use.

Also disclosed is a method in a wireless device. The method comprises obtaining information about an allocated pool of radio resources for vehicle-to-other (V2x) communication by a plurality of wireless devices, the allocated pool of radio resources divided into a plurality of orthogonal sets of radio resources, each set of radio resources having an associated set identifier comprising one of a plurality of positive integers. The method further comprises selecting a radio resource for V2x communication from the plurality of sets of radio resources, the wireless device prioritizing selection of available radio resources belonging to sets of radio resources having associated set identifiers comprising low positive integers.

In certain embodiments, each set of radio resources may include a single radio resource, and selecting a radio resource for V2x communication from the plurality of sets of radio resources may comprise selecting a set of radio resources having an available radio resource and a set identifier corresponding to a lowest positive integer number among the one or more radio resource sets. In certain embodiments, each set of radio resources may include multiple radio resources, and selecting a radio resource for V2x communication from the plurality of sets of radio resources may comprise selecting a set of radio resources having available radio resources and a set identifier corresponding to the lowest positive integer number among the one or more radio resource sets, and selecting a radio resource from the selected set of radio resources.

In certain embodiments, the radio resource may be selected from the plurality of resource sets having available radio resources and a set identifier smaller than a defined number. Selecting a radio resource from the selected set of radio resources may comprise selecting the radio resource based at least in part on one or more radio measurements performed by the wireless device or another wireless device of the plurality of wireless devices. The method may further comprise communicating one or more reports on one or more of utilization of individual radio resources, utilization of sets of radio resources, a total load, and an average load. The one or more reports may comprise one or both of geographical information and information about which wireless devices of the plurality of wireless devices are using particular radio resources.

Also disclosed is a wireless device. The wireless device comprises one or more processors. The one or more processors are configured to obtain information about an allocated pool of radio resources for vehicle-to-other (V2x) communication by a plurality of wireless devices, the allocated pool of radio resources divided into a plurality of orthogonal sets of radio resources, each set of radio resources having an associated set identifier comprising one of a plurality of positive integers. The one or more processors are configured to select a radio resource for V2x communication from the plurality of sets of radio resources, the wireless device prioritizing selection of available radio resources belonging to sets of radio resources having associated set identifiers comprising low positive integers.

Certain embodiments of the present disclosure may provide one or more technical advantages. For example, in certain embodiments resource fragmentation may be advantageously reduced. As another example, the spatial reutilization of V2x resources in a cellular environment may be improved. As another example, unused resources may be allocated to other applications. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, there is a need for an improved resource allocation scheme that provides for a higher degree of spatial reutilization. A higher degree of spatial reutilization may advantageously allow redeployment of unused resources for other applications. The present disclosure contemplates various embodiments that may address resource allocation and the need for increased spatial reutilization. For example, in certain embodiments, a network node may allocate a pool of radio resources for V2x communication by a plurality of wireless devices. The network node may divide the allocated pool of radio resources for V2x communication into a plurality of orthogonal sets of radio resources. Each set of radio resources may have an associated set identifier. The set identifier may be a positive integer. The network node may assign one or more radio resource sets to each wireless device among the plurality of wireless devices based at least in part on a radio-compatibility characteristic, and communicate to each wireless device the assigned set of radio resources to use.

As another example, in certain embodiments a wireless device may obtain information about an allocated pool of radio resources for V2x communication by a plurality of wireless devices. The allocated pool of radio resources may be divided into a plurality of orthogonal sets of radio resources. Each set of radio resources may have an associated set identifier, such as a positive integer. The wireless device may select a radio resource for V2x communication from the plurality of sets of radio resources, prioritizing selection of available radio resources belonging to sets of radio resources having low positive integer set identifiers.

Figure 1:
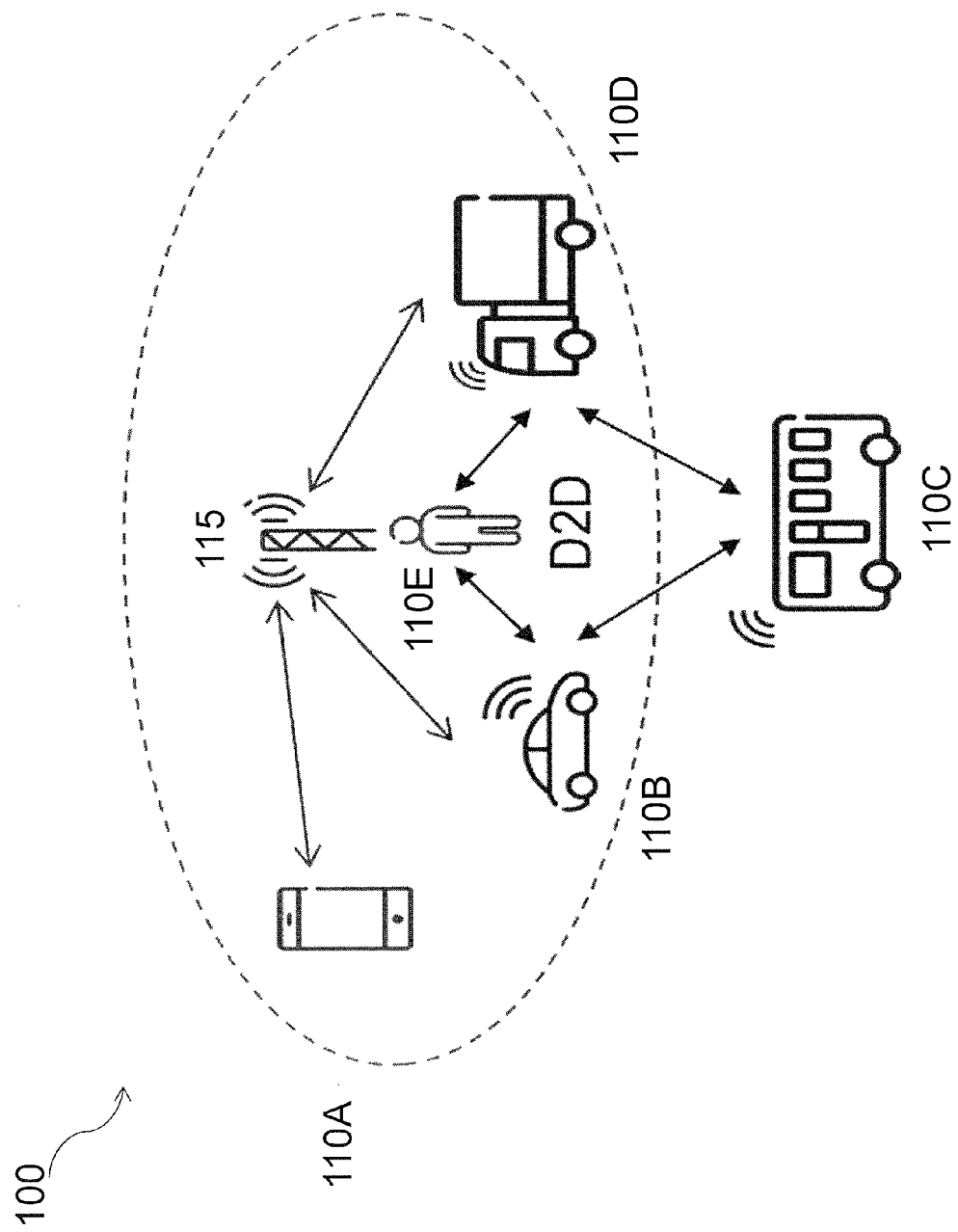
FIG. 1 illustrates an embodiment of a wireless communications network, in accordance with certain embodiments.

FIG. 1 is a block diagram illustrating an embodiment of a network 100 that includes one or more wireless device(s) 110 (which may be interchangeably referred to as UEs 110) and network node(s) 115 (which may be interchangeably referred to as eNBs 115). More particularly, wireless device 110A is a smart phone, wireless devices 110B-D are vehicles, and wireless device 110E is a pedestrian having a wireless device 110, such as, for example, a smart phone. Wireless devices 110 may communicate with a network node 115, or with one or more other wireless devices 110 over a wireless interface. For example, wireless device 110A, 110B, and 110D may transmit wireless signals to network node 115 and/or receive wireless signals from network node 115. Wireless devices 110 may also transmit wireless signals to other wireless devices 110 and/or receive wireless signals from other wireless devices 110. For example, wireless devices 110B, 110C, 110D, and 110E may communicate using D2D communication. The wireless signals may contain voice traffic, data traffic, control signals, and/or any other suitable information. In some embodiments, an area of wireless signal coverage associated with a network node 115 may be referred to as a cell.

In certain embodiments, network node 115 may interface with a radio network controller. The radio network controller may control network node 115 and may provide certain radio resource management functions, mobility management functions, and/or other suitable functions. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding.

In some embodiments, the core network node may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network. Example embodiments of wireless device 110, network node 115, and other network nodes (such as radio network controller or core network node) are described in more detail with respect to FIGS. 14, 15, and 16, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115. Although the various embodiments may be described in the context of LTE networks, the present disclosure contemplates that the various embodiments may be applied to LTE evolution or to any other wireless systems, including 5G standards. Furthermore, although certain embodiments may be described in the context of V2x applications, the various embodiments may be advantageously applied to other applications.

As described above, V2x communication may include any combination of direct communication between vehicles, pedestrians, and infrastructure. FIG. 1 illustrates a variety of V2x scenarios in which the various embodiments of the present disclosure may be applied. As an example of V2I communication, wireless device 110A, 110B, and 110D may communicate wirelessly with network node 115. As an example of V2P communication, wireless devices 110B and 110D may communicate with a pedestrian having a wireless device 110E. As an example of V2V communication, wireless devices 110B, 110C, and 110D may communicate wirelessly with each other.

In general, different types of communications (e.g., cellular communication, V2x, etc.) may have different intended transmission ranges. In cellular applications, it is usually desirable that the signal broadcasted by network node 115 can be correctly received anywhere in the network cell. In contrast, V2x communications may have a target range of a few hundred meters around the transmitter, much less than the size of many network cells. In addition, power control of V2x signals may further affect their coverage. Given that V2x communications may be distributed over a network cell following the road infrastructure, a single network cell may contain several groups of devices engaged in V2x communication. Due to their shorter range, V2x communications may only be possible among devices in the same group.

Figure 2:
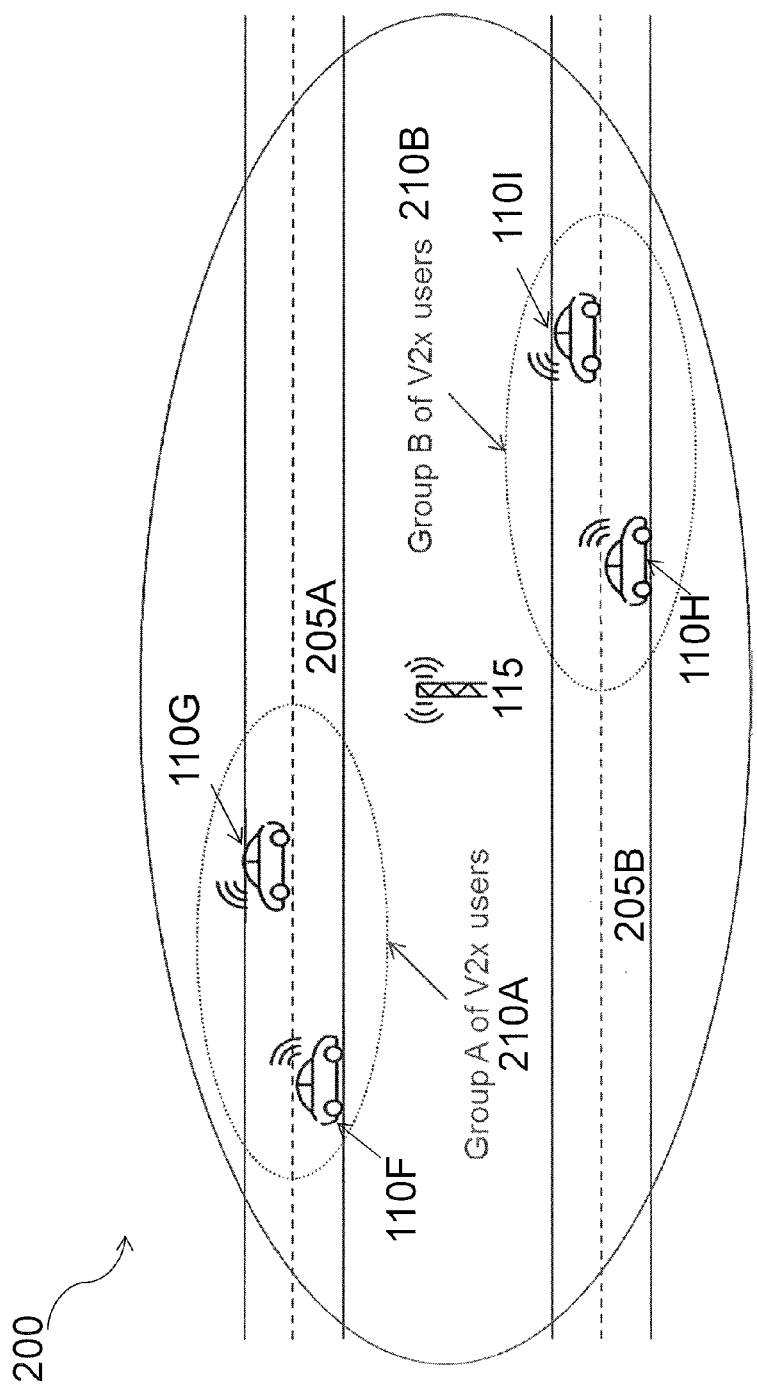
FIG. 2 illustrates an example scenario of a network cell with groups of wireless devices engaged in V2x communication, in accordance with certain embodiments.

FIG. 2 illustrates an example scenario of a network cell 200 with groups of wireless devices 110 engaged in V2x communication, in accordance with certain embodiments. More particularly, FIG. 2 illustrates a network node 115 having associated cell 200. Within cell 200 associated with network node 115 are a plurality of wireless devices 110F, 110G, 110H, and 110I. As described above, wireless devices 110F-I may be capable of V2x communication.

Within the coverage area of cell 200 are two roads 205A and 205B. Road 205A and 205B may be separated from each other. Each of roads 205A and 205B has an associated group of wireless devices engaged in V2x communication. For example, road 205A is associated with Group 210A, which includes wireless devices 110E and 110G, and road 205B is associated with Group 210B, which includes wireless devices 110H and 110I. The distance between Group 210A and Group 210B may be sufficiently large such that users in one group do not create significant interference to users in the other group. For example, wireless devices 110F and 110G of Group 210A may use V2x communication without creating significant interference to wireless devices 110H and 110I of Group 210B, and vice versa. Furthermore, the distance between Group 210A and Group 210B may be sufficiently large such that wireless devices in Group 210A may be unable to effectively communicate with wireless devices in Group 210B or communication between wireless devices in Group 210A and wireless devices in Group 210B is not possible.

Note that the division of the users into groups illustrated in FIG. 2 may only be indicative. In certain embodiments, the different groups of users 210A and 210B may only exist insofar as the propagation conditions between users (e.g., wireless devices 110F-I) within each group allow for communication or yield a significant interference, etc. In such case, wireless devices 110F-I may not be aware of the existence of different groups, and/or may not be aware of the fact that they may belong to one of the groups. In certain embodiments, Groups 210A and 210B may be the result of an explicit process (e.g., a clustering algorithm) or may have been defined by network node 115 or another network node. In such a case, wireless devices 110F-I may or may not be aware of the existence of groups, and that they may belong to one of them.

If network node 115 groups users, it may do so based on any suitable criteria. For example, network node 115 may group wireless devices 110F-I according to one or more radio-compatibility characteristics. The radio-compatibility characteristics may be any suitable characteristics. For example, the radio-compatibility characteristic may be one or more of a distance measurement and a direct radio measurement between wireless devices. For example, a set of resources may be used by a first group of wireless devices 110 that are sufficiently close to each other (in a radio or geographical meaning), as well as by a second group of users that is sufficiently far away from the first group, where far away may mean that users in the second group would not create significant interference to users in the first group. In general, geographical proximity may not coincide with radio-propagation proximity. This may be due to a variety of reasons, such as the presence of large obstacles. For example, wireless devices on vehicles on parallel streets separated by high buildings may be in close geographical proximity (i.e., may be close to each other in distance), but the propagation losses between them may be very high. Network node 115 may assign a different set of resources to wireless devices 110 that are neither sufficiently close to each other nor sufficiently far away from each other.

In scenarios where V2x communications share radio resources with other applications (such as, for example, cellular communications), it is important that the resources used for V2x have a high degree of spatial resource reutilization. This frees up resources for other types of applications. In general, spatial reutilization of V2x resources implies that the resource allocation schemes for V2x devices, such as wireless devices 110F-I, enable wireless devices in different groups to reuse some of the resources. For example, in certain embodiments wireless devices 110F and 110G of Group 210A may use some of the same resources as wireless devices 110H and 110I in group 210B.

In general, V2x resource allocation schemes may be based on a hybrid combination of centralized network-based resource allocation and distributed UE-based resource allocation. For example, network node 115 may provide a pool of contention-based resources for V2x transmission, and wireless devices 110 may select resources within the provided pool. Selection of resources by wireless devices 110 may be based on schemes that sense the interference and usage of a set of potential resources, and strive for usage of free or underutilized radio resources. In general, V2x resources are expected to be multiplexed at least in both time (TDMA) and frequency (FDMA) domains. Reasonable resource allocation algorithms strive to avoid even partial overlaps between occupied time/frequency radio resources and those selected for V2x transmission. In general, however, these algorithms are not designed for scenarios where the resources are shared between V2x and other applications, including cellular communication. In addition, they do not consider spatial resource reutilization. Consequently, the set of resources used by all the V2x devices in the network cell may not be optimized from a spatial reutilization point of view. A potential outcome of such a resource allocation policy is described below in relation to FIG. 3.

The present disclosure contemplates various embodiments that may address resource allocation and facilitate spatial reutilization. In certain embodiments, a network node may allocate a pool of radio resources for V2x communication by a plurality of wireless devices 110. The network node may divide the allocated pool of radio resources for V2x communication into a plurality of orthogonal sets of radio resources. Each set of radio resources may have an associated set identifier, such as, for example, one of a plurality of positive integers. The network node may assign one or more radio resource sets to each wireless device among the plurality of wireless devices based on any suitable criteria. For example, the network node may assign one or more radio resource sets to each wireless device based on one or more radio-compatibility characteristics. The network node may communicate to each wireless device the assigned set of radio resources to use.

The one or more wireless devices 110 may obtain information about the allocated pool of radio resources for V2x communication, and select a radio resource for V2x communication from the plurality of sets of radio resources. Wireless devices may select one of the radio resources within the selected set of radio resources according to one or more rules. For example, wireless devices 110 may prioritize selection of available radio resources belong to sets of radio resources having low associated set identifiers.

As described above, a pool of radio resources (e.g., time, frequency, etc.) may be allocated for use by wireless devices 110 for V2x communication. In certain embodiments, the allocated pool of radio resources for V2x communication may be predefined, and known by one or more of wireless devices 110. Another possibility is that the radio resources may be dynamically allocated by network node 115. In such a case, network node 115 may broadcast information about the dynamically allocated pool of radio resources to wireless devices 110 in its coverage area 200. In certain embodiments, a combination of these approaches may be used. For example, a static, preconfigured pool of radio resources for V2x communication may be used in combination with a dynamically allocated set of resources. In such a case, network node 115 may broadcast information about the dynamically allocated pool of resources to wireless devices 110.

The pool of radio resources allocated for V2x communication may then be divided into sets. The allocated pool of radio resources may be divided into sets in any suitable manner. A set may include any suitable number of radio resources. For example, the network node may divide the allocated pool of radio resources into a plurality of orthogonal sets of radio resources. In certain embodiments, the sets of radio resources may contain one or more basic time-frequency resources. In certain embodiments, the sets of radio resources may be associated with a set identifier. The set identifier may be any suitable identifier. As one example, the set identifier may be a positive integer number. In certain embodiments, each set of radio resources may contain a single radio resource, and the set identifier may be unique for each radio resources. In certain embodiments, each set of radio resources may contain multiple radio resources (i.e., the index may identify a collection of V2x resources).

One or more sets of radio resources may be assigned to each wireless device 110 among the plurality of wireless devices 110. The assignment may be based on any suitable criteria. In certain embodiments, the network node may assign a set of radio resources to a wireless device based at least in part on a radio-compatibility characteristic. The radio-compatibility characteristic may be one or more of a distance measurement and a direct radio measurement between wireless devices. For example, all of the users in Group 210A may be within a certain distance or radio proximity of one another (i.e., sufficiently close to each other), such that they can communicate effectively using V2x communication. Network node 115 may, therefore, assign the same sets of radio resources to users in Group 210A. Meanwhile, all of the users in Group 210B may be within a certain distance or radio proximity of one another (i.e., sufficiently close to each other in distance or in a radio propagation sense), such that they can communicate effectively using V2x communication. Network node 115 may, therefore, assign the same sets of radio resources to users in Group 210B. Furthermore, users in Group 210A and Group 210B may be separated in terms of distance or radio proximity such that V2x communication by users in Group 210A may not cause substantial interference to users in Group 210B (i.e., sufficiently far apart), and vice versa. In such a case, network node 115 may assign the same sets of radio resources to users in Group 210A and 210B. Assuming that a third group was present in network cell 200 within a close enough distance or radio proximity such that V2x communication among users in this third group would cause substantial interference with Groups 210A and 210B, network node 115 may assign a different set of radio resources to wireless devices 110 in the third group.

Wireless devices 110 may obtain information about the pool of resources allocated for V2x communication. In certain embodiments, the division of the V2x resources into sets may be known by all wireless devices 110. As one example, the pool of radio resources allocated for V2x communication may be predefined. As another example, network node 115 may broadcast information about the division of V2x resources into sets to wireless devices 110. An example of the division of V2x resources into sets is described in more detail below in relation to FIG. 4.

A wireless device 110 may then select a radio resource from the assigned set of radio resources for use in V2x communication. In certain embodiments, the selection may be based on one or more rules that use the categorization into sets to ensure that the radio resources are progressively occupied. As described above, a particular set of radio resources may have an associated set identifier, which in certain embodiments may be a positive integer number. In certain embodiments, each set of radio resources may include a single radio resource, with each set identified by a unique positive integer set identifier. In such an embodiment, wireless device 110 may select a set having an available radio resource and the lowest set identifier among sets having an available radio resource. To illustrate, consider the following example. Wireless device 110F may select a set with the lowest positive integer set identifier. Thus, if wireless device is assigned to two sets of radio resources, one having a set identifier of 1, and the other having a set identifier of 3, wireless device 110F selects the set with the set identifier of 1 if it has available radio resources.

In certain embodiments, each set may include multiple radio resources, and the set identifier may identify several radio resources. In such a case, wireless device 110 may search among those sets having enough free resources (according to some criterion), and select the set of radio resources having the smallest set identifier. The resource set may be chosen in any suitable manner. In certain embodiments, wireless device 110 may choose the resource set itself. As another example, the resource set may be assigned by another node in the network, such as network node 115 or any other suitable network node. In such a case, network node 115 (or other suitable network node) may communicate the assigned resource set using appropriate signaling. If the resource set is assigned by network node 115, the decision may be based on one or more reports from wireless devices 110 or on one or more measurements at network node 115.

Wireless device 110 may then select one of the radio resources within the set according to one or more rules. For example, wireless device 110 may select one of the radio resources according to interference measurements for different parts of the resources. As another example, wireless device 110 may select one of the radio resources according to some criterion in that set. In certain embodiments, wireless device 110 may select one of the radio resources in the selected set as well as in other sets that have been progressively occupied in the past using one of the approaches described herein. For example, all sets with a set identifier smaller than the set identifier of a previously selected set. The selection of a resource set and the selection of one or more resources within the set is described in more detail below in relation to FIG. 5.

In certain embodiments, the progressive allocation may be different for different types of users. For example, one or more wireless devices 110 may have different rules depending on whether they are in network coverage, in partial coverage, or without coverage. In the case that the groups of users are explicitly defined by network node 115, network node 115 may define the groups at any suitable point. For example, in certain embodiments, network node 115 may define one or more groups before, during, or after dividing the radio resources allocated for V2x communication into sets or before, during, or after wireless device 110 selects a resource set.

In certain embodiments, one or more wireless devices 110 may report information regarding the utilization of the radio resources to the network. The reports may include any suitable information. For example, wireless devices 110A-D may report on one or more of the utilization of individual resources, utilization of sets of resources, total load, and average load. As another example, the reports may include geographical information. The geographical information may allow the network to map the V2x resource load over the network cell 200 area. As yet another example, the reports may include information about which wireless devices 110 are using particular radio resources. In certain embodiments, the information about which wireless devices 110 are using particular radio resources may be based on detected signals, and/or sensing of other signals. As yet another example, the report may include information that may be related to the traffic load for certain resources, such as for example the utilization ratio for a certain resource. As still another example, a report may include information about the cell 200 and/or a synchronization reference associated to wireless devices 110 occupying certain resources.

In certain embodiments, the network may reutilize unused V2x resources for other types of applications. In addition, the network may use geographical information to allocate resources in a way that is compatible with the V2x communications in the network cell. For example, it may reallocate the V2x resources (used or unused) for D2D communication to devices that are sufficiently far from the area of V2x communication.

Figure 3:
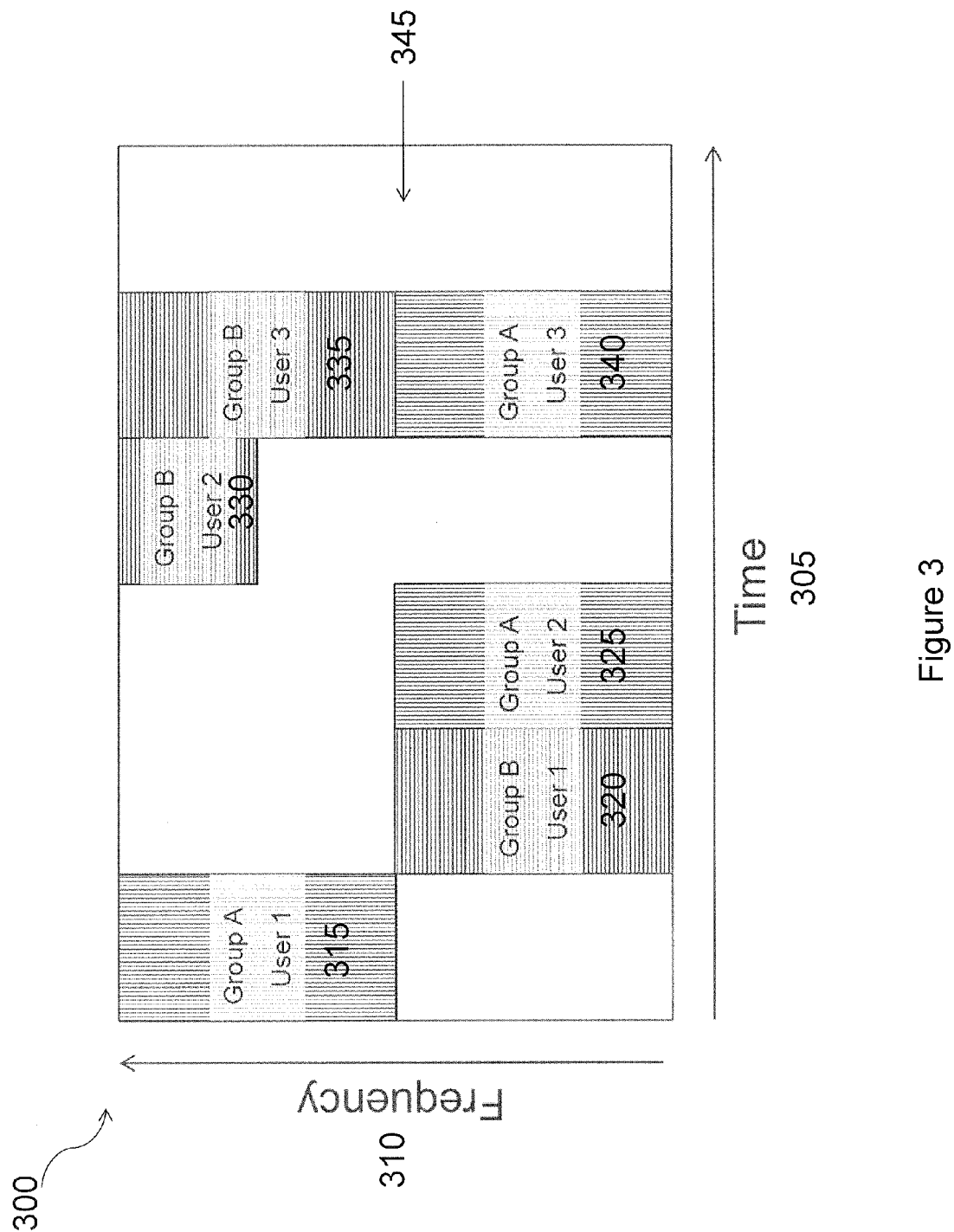
FIG. 3 illustrates an example resource allocation having poor spatial reutilization, in accordance with certain embodiments.

FIG. 3 illustrates an example resource allocation with poor spatial reutilization, in accordance with certain embodiments. More particularly, FIG. 3 illustrates a time-frequency grid 300 that depicts time 305 and frequency 310 resources available for V2x communication. Similar to FIG. 2 described above, there are two groups of users Group A and Group B, with three users in each group. Group A includes User 1 315, User 2 325, and User 3 340. Group B includes User 1 320, User 2 330, and User 3 335. Note that as described above, the resources selected by each user in both groups avoid even partial overlaps between occupied time/frequency radio resources and those selected for V2x transmission. Although the total system resource utilization factor is below ½, only ⅙ of the V2x time resources (i.e., the last time slot 345) can be reused for cellular applications using a time-division multiplexing approach. Thus, while the resource allocation scheme illustrated in FIG. 3 succeeds in avoiding having users in the same group choosing the same resources, it does so at the expense of not performing spatial reuse of the resources. Consequently, very few V2x time resources remain unused all over the network cell, potentially resulting in very few resources available for reuse for other applications.

Figure 4:
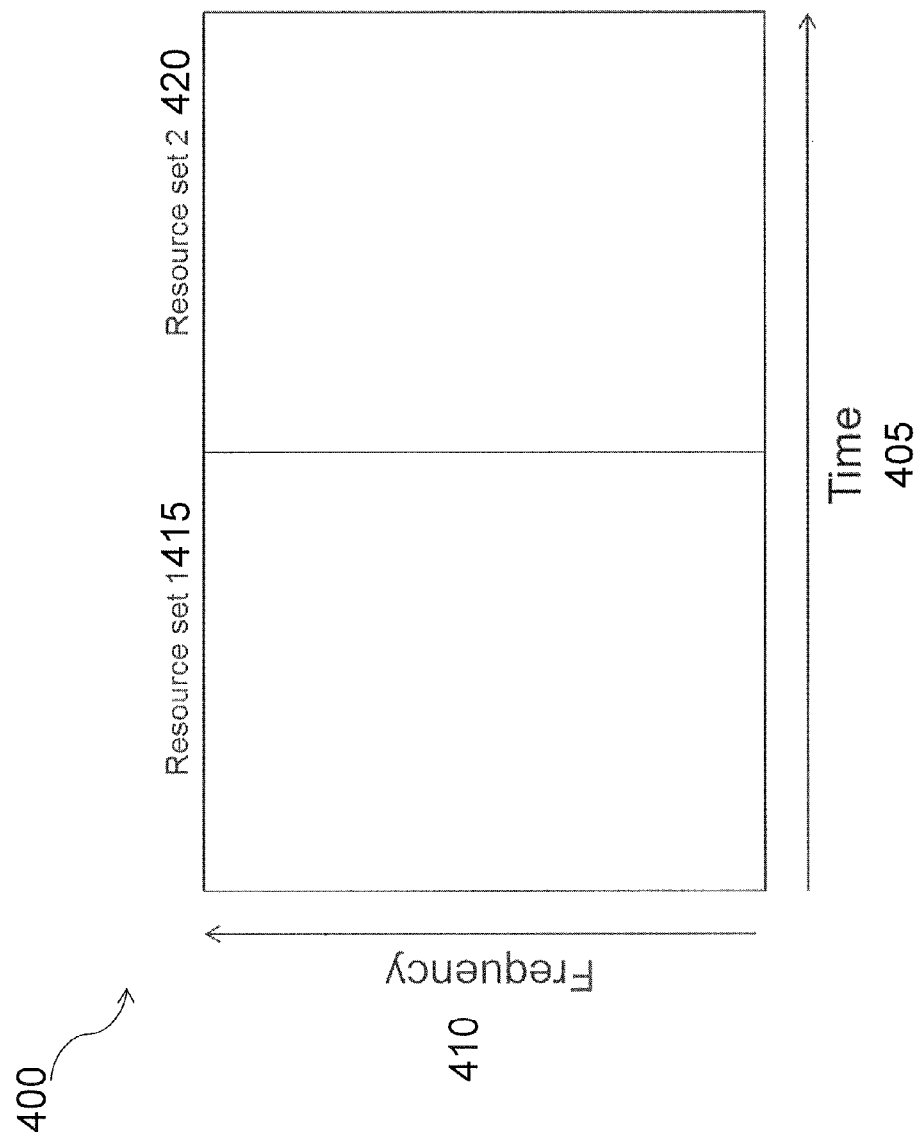
FIG. 4 illustrates an example of the division of V2x resources into sets, in accordance with certain embodiments.

FIG. 4 illustrates an example of the division of V2x resources into sets, in accordance with certain embodiments. More particularly, FIG. 4 illustrates a time-frequency grid 400 that depicts the time 405 and frequency 410 resources available for V2x communication divided into sets. In FIG. 4, the defined radio resources for V2x communication have been divided into two sets 415 and 420, each set containing several time-frequency resources. Recall that each set may have an associated set identifier. For example, Resource Set 1 415 may include those resources with small time indices, whereas Resource Set 2 420 includes those resources with large time indices.

Figure 5:
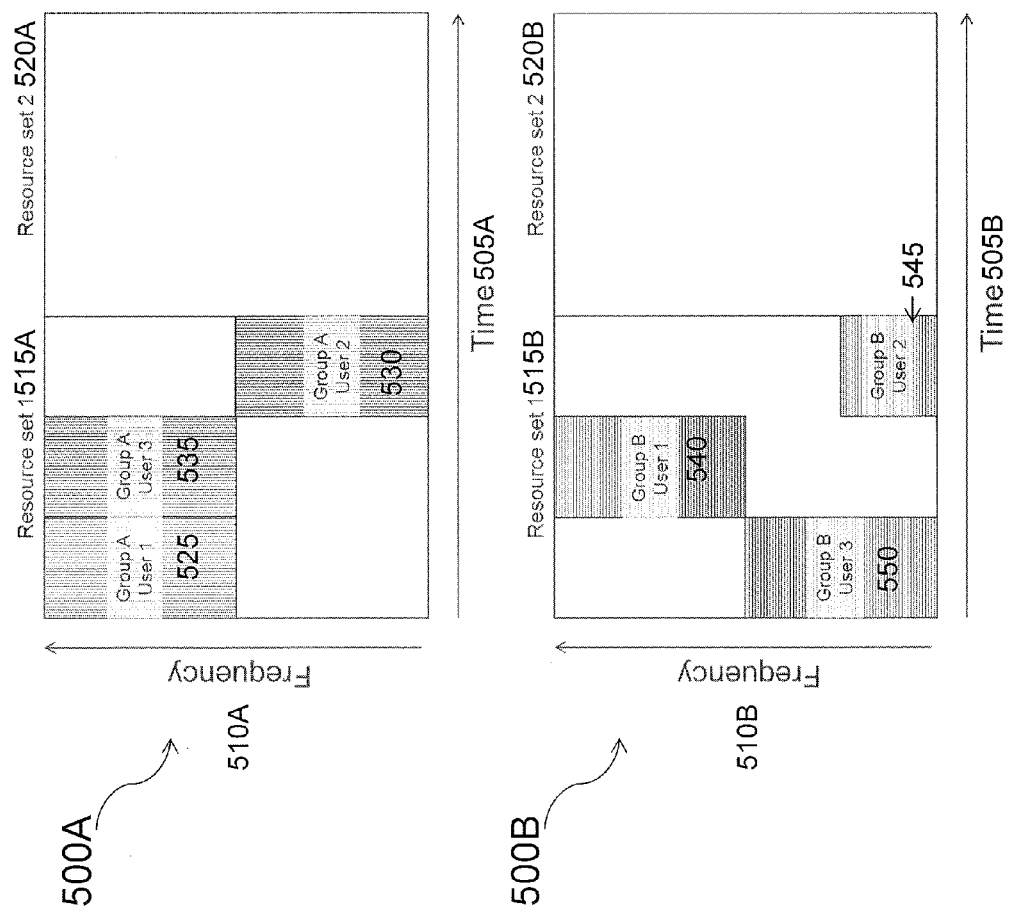
FIG. 5 illustrates an example of a selection of a resource set and one or more resources within the selected set, in accordance with certain embodiments.

FIG. 5 illustrates an example of a selection of a resource set and one or more resources within the selected set, in accordance with certain embodiments. More particularly, FIG. 5 illustrates two time-frequency grids 500A and 500B that depict the respective time 505A, 505B and frequency 510A, 510B resources available for V2x communication by two groups, Group A and Group B. Group A includes User 1 525, User 2 530, and User 3 535. Group B includes User 1 540, User 2 545, and User 3 550. Time-frequency grid 510A illustrates the resource selection of users in Group A, in which Users 525, 530, and 535 all select Set 1 515A. Within Set 1 515A, Users 525, 530, and 535 select some radio resources according to their needs. Within Group B, Users 540, 545, and 550 also select resources from Set 1 515B.

Figure 6:
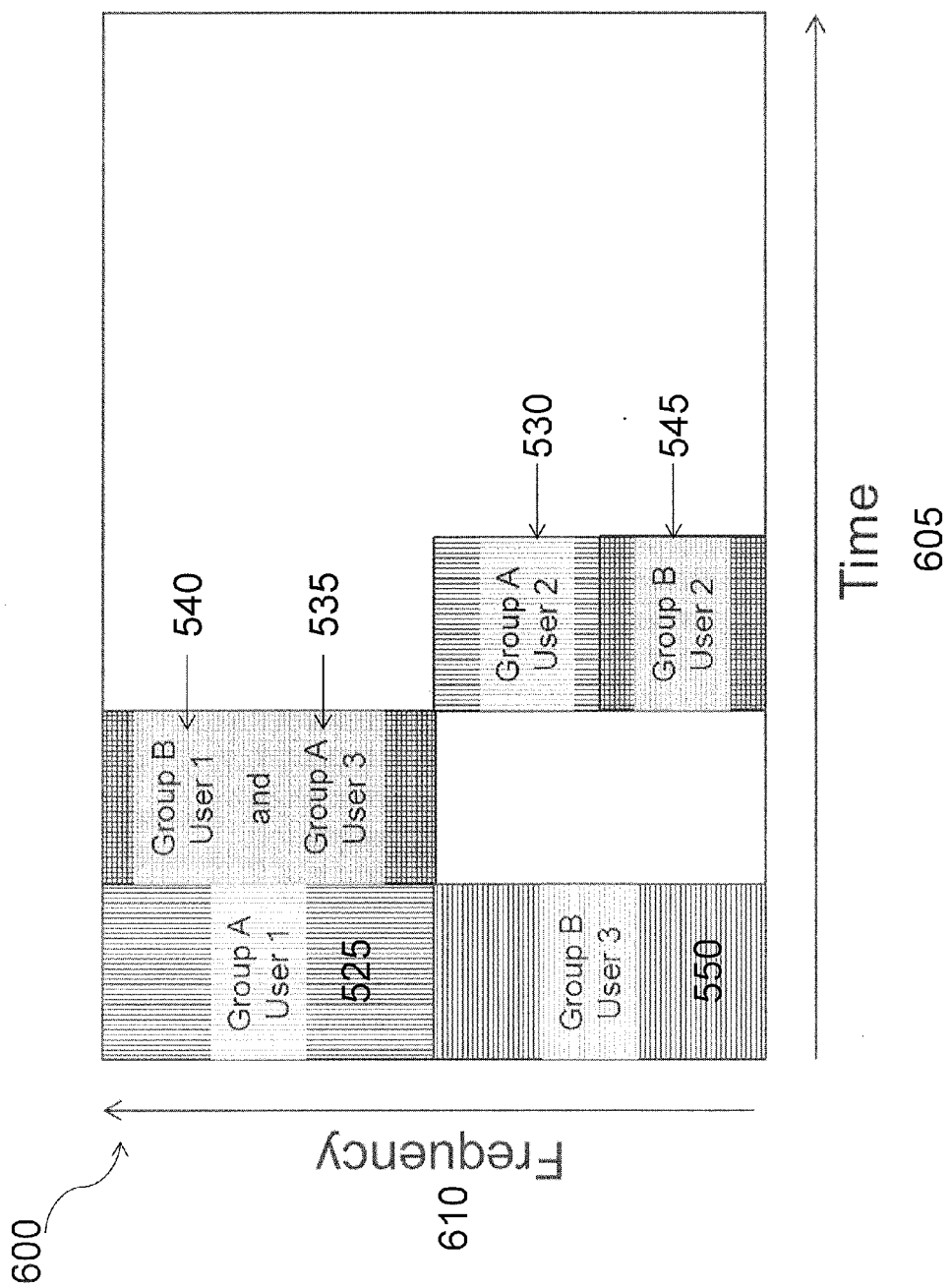
FIG. 6 illustrates an example resource allocation having improved spatial reutilization, in accordance with certain embodiments.

FIG. 6 illustrates an example of a resource allocation with improved spatial reutilization, in accordance with certain embodiments. More particularly, FIG. 6 illustrates the superposition of radio resource allocations 500A and 500B described above in relation to FIG. 5. Note that the devices in the different groups prioritize using resources with small set identifiers indices. From a network cell point of view, ½ of the V2x time resources can be reutilized for other applications using a time-division multiplexing approach. Thus, there are substantially more resources available for spatial reutilization than, for example, the resource allocation described above in relation to FIG. 3. Resource allocation according to the various embodiments described herein may advantageously reduce resource fragmentation and allow for spatial reutilization of radio resources. To further illustrate the advantages of the various embodiments described herein, consider the following scenario described below in relation to FIGS. 7-11.

Figure 7:
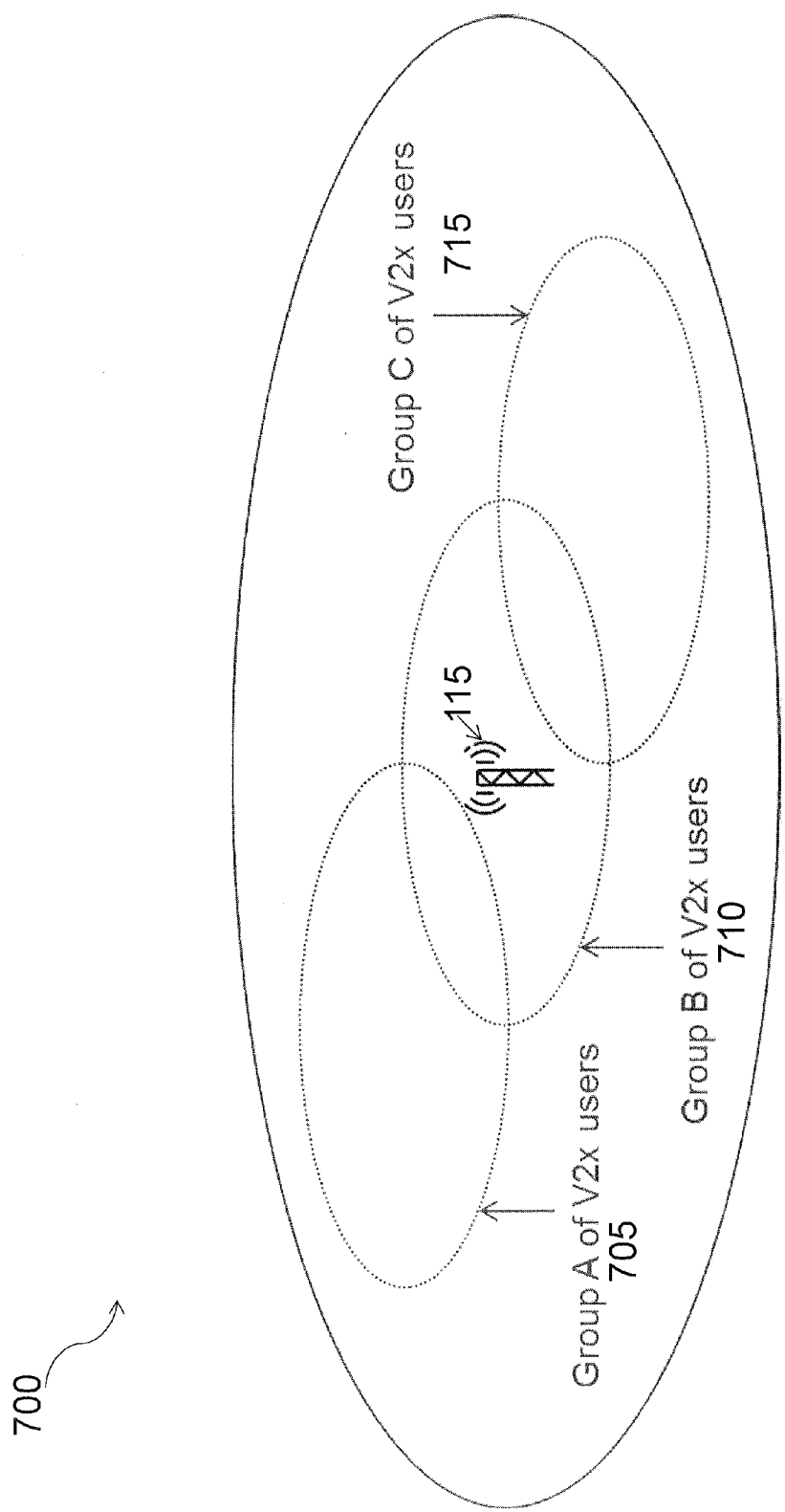
FIG. 7 illustrates an example scenario of a network cell with three groups of V2x users, in accordance with certain embodiments.

FIG. 7 illustrates an example scenario of a network cell 700 with three groups of V2x users, in accordance with certain embodiments. Network cell 700 is the coverage area associated with network node 115. Network cell 700 includes three groups of users: Group A 705, Group B 710, and Group C 715. For the purposes of this example, assume that Group A 705 includes four wireless devices (such as wireless devices 110 described above), Group B 710 includes 1 wireless device, and Group C 715 includes 2 devices. Assume further that: users within Group A 705 are engaged in V2x communication with each other; users within Group C 715 are engaged in V2x communication with each other; and the user in Group B 710 is broadcasting V2x signals. Assume that the users in Group A 705 may interfere significantly with the user in Group B 710 (and vice versa). Similarly, users in Group C 715 may interfere significantly with the user in Group B 710 (and vice versa). The interference created by users in Group A 705 to users in Group C 715 (and vice versa) may be negligible.

Thus, in the scenario illustrated in FIG. 7 the propagation characteristics between the users of different groups are different. The users, which are not necessarily aware of the definition of the groups, may use the various embodiments described herein to achieve a progressive utilization of the V2x resources. This may ensure that wireless devices that are sufficiently far away from each other (in a radio sense) may utilize the same resources (i.e., spatial reutilization). This also results in smaller resource fragmentation.

Figure 8:
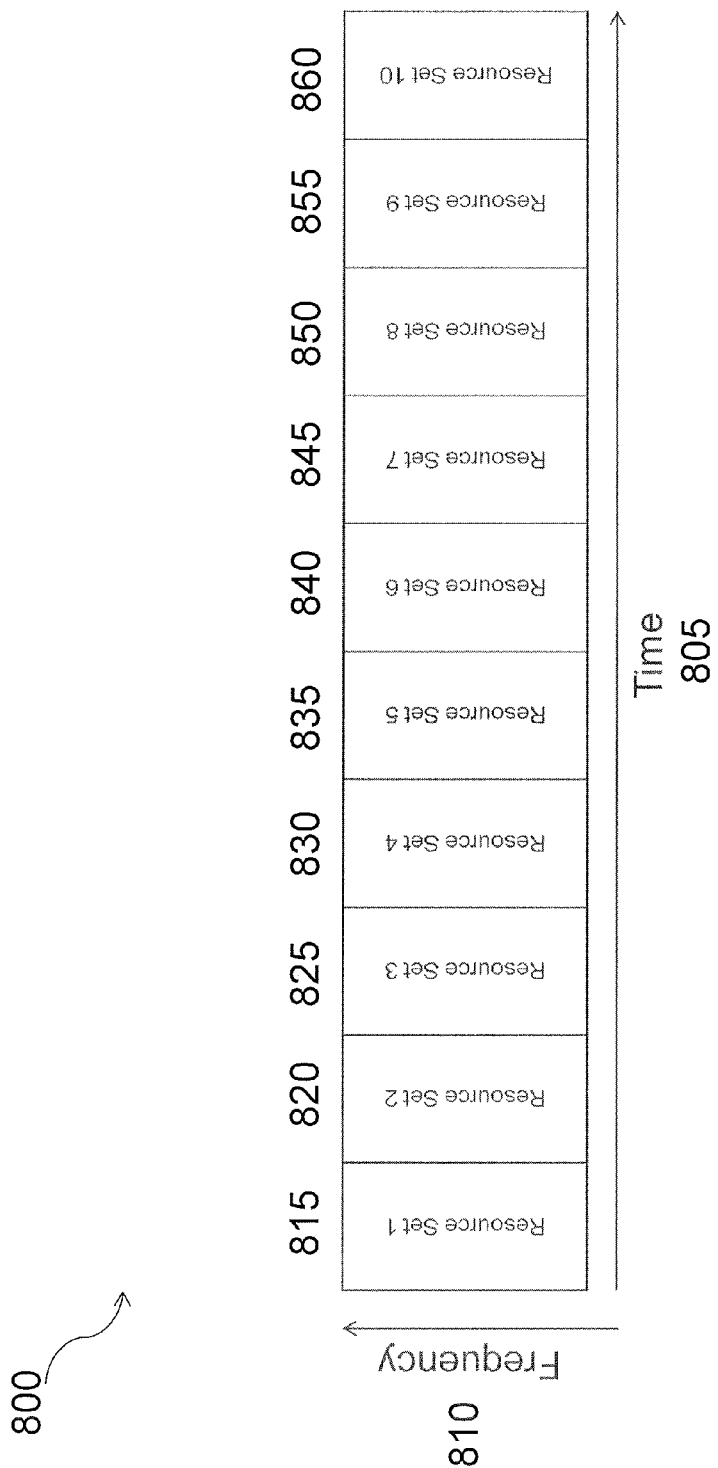
FIG. 8 illustrates an example partitioning of a pool of radio resources into sets, in accordance with certain embodiments.

FIG. 8 illustrates an example partitioning of a pool of radio resources into sets, in accordance with certain embodiments. FIG. 8 illustrates an allocated set of radio resources 800 in time 805 and frequency 810. As described above, a defined pool of radio resources may be allocated for use by a plurality of wireless devices for V2x communication. In certain embodiments, the defined pool of radio resources 800 may be divided into sets. Each set may have an associated set identifier, such as a positive integer number. The set identifier may be unique for each radio resource (i.e., when each set contains only one radio resource), or may be shared by several resources (i.e., when each set contains multiple radio resources).

For example, the defined pool of radio resources 800 may be divided into 10 sets, namely Resource Set 1 815, Resource Set 2 820, Resource Set 3 825, Resource Set 4 830, Resource Set 5 835, Resource Set 6 840, Resource Set 7 845, Resource Set 8 850, Resource Set 9 855, and Resource Set 10 860. For purposes of this example, assume that Resource Set 1 815 has a set identifier of 1, Resource Set 2 820 has a set identifier of 2, Resource Set 3 825 has a set identifier of 3, and so on. In the scenario illustrated in FIG. 8, each Resource Set 815-860 consists of a single radio resource.

Figure 9:
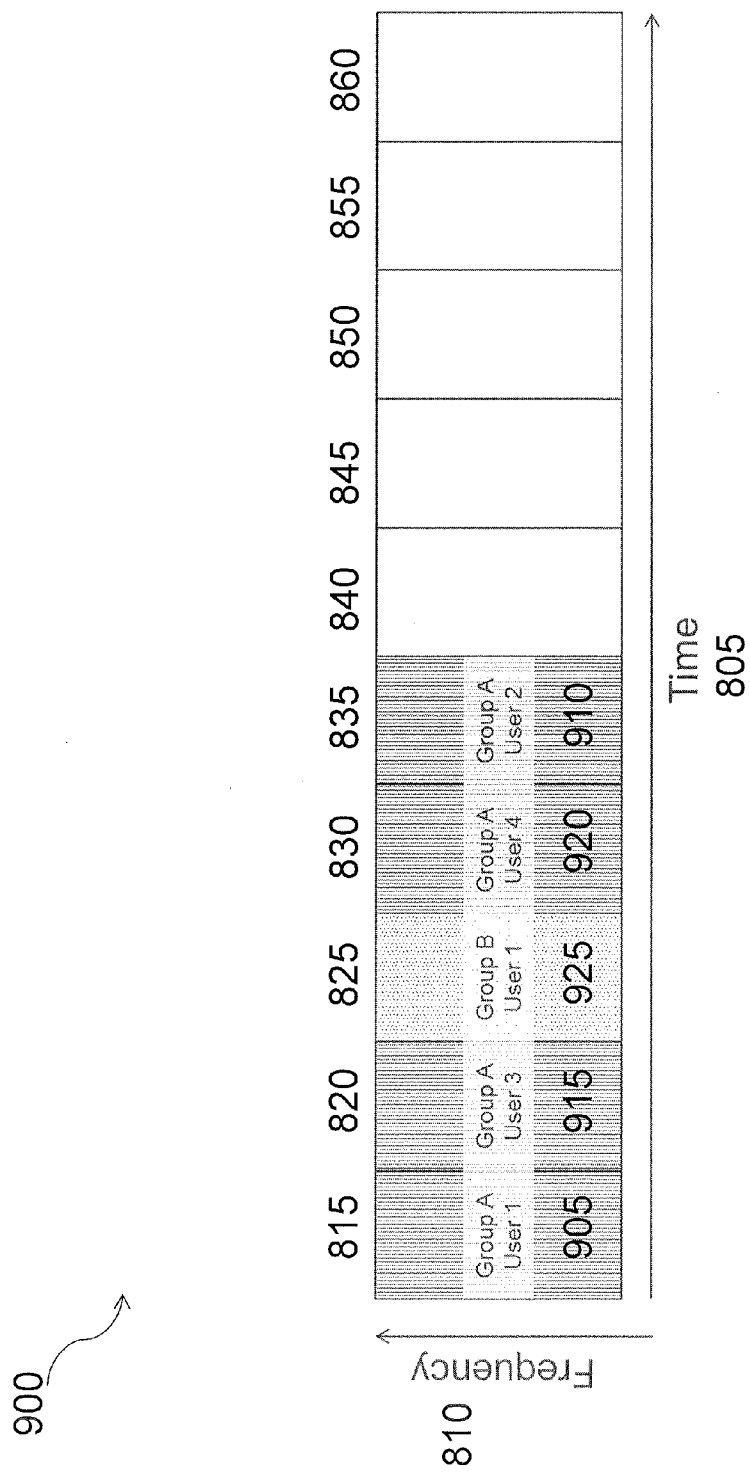
FIG. 9 illustrates an example resource allocation for users in Group A and Group B described in relation to FIG. 7, in accordance with certain embodiments.

FIG. 9 illustrates an example resource allocation for users in Group A 705 and Group B 710 described in relation to FIG. 7, in accordance with certain embodiments. As described above, Group A 705 includes four wireless devices and Group B 710 includes 1 device. The wireless devices in Group A include User 1 905, User 2 910, User 3 915, and User 4 920. The wireless device in Group B includes User 1 925. Recall that the wireless devices within a group may be engaged in V2x communication with each other, and that the users in Group A 705 may interfere significantly with the user in Group B 710 (and vice versa). In certain embodiments, the users in Group A 705 and Group B 710 may select the set of radio resources having the smallest set identifier. Thus, the resources will be progressively allocated, with the resources having smaller set identifiers occupied before those having larger set identifiers. For example, User 1 905 of Group A 705 may select Resource Set 1 815, User 3 915 of Group A 705 may select Resource Set 2 820, User 1 925 of Group B 710 may select Resource Set 3 825, User 4 920 of Group A 705 may select Resource Set 4 830, and User 2 910 of Group A 705 may select Resource Set 5 835. Each user may then use their respective selected resource set for V2x communication.

Figure 10:
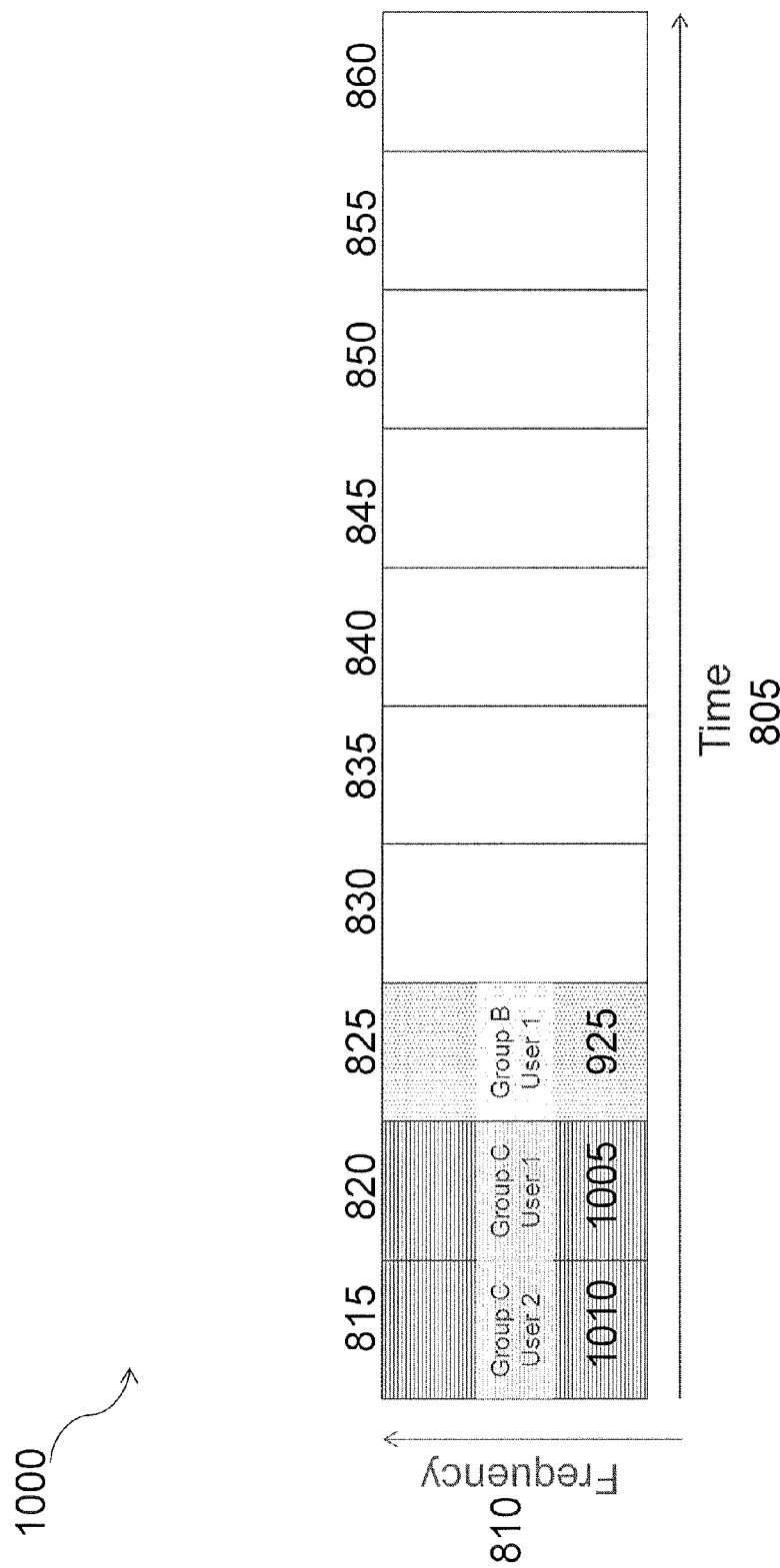
FIG. 10 illustrates an example resource allocation for users in Group B and Group C described in relation to FIG. 7, in accordance with certain embodiments.

FIG. 10 illustrates an example resource allocation for users in Group B 710 and Group C 715 described in relation to FIG. 7, in accordance with certain embodiments. Recall that Group B 710 includes 1 device, and Group C 715 includes 2 devices. The wireless device in Group B 710 includes User 1 925. The wireless devices in Group C 715 include User 1 1005 and User 2 1010. Recall that users in Group C 715 may interfere significantly with the user in Group B 710 (and vice versa), while the interference created by users in Group A 705 to users in Group C 715 (and vice versa) may be negligible. As described above in relation to FIG. 9, User 1 925 of Group B 710 has selected Resource Set 3 825 to use for V2x communication. Users in Group C are not aware of the presence of Group A users. Consequently, users in Group C can reutilize the resources used by users in Group A, and select the set of radio resources having the smallest index number. Thus, Group C User 2 1010 selects Resource Set 1 815 and Group C User 1 1005 selects Resource Set 2 820.

Figure 11:
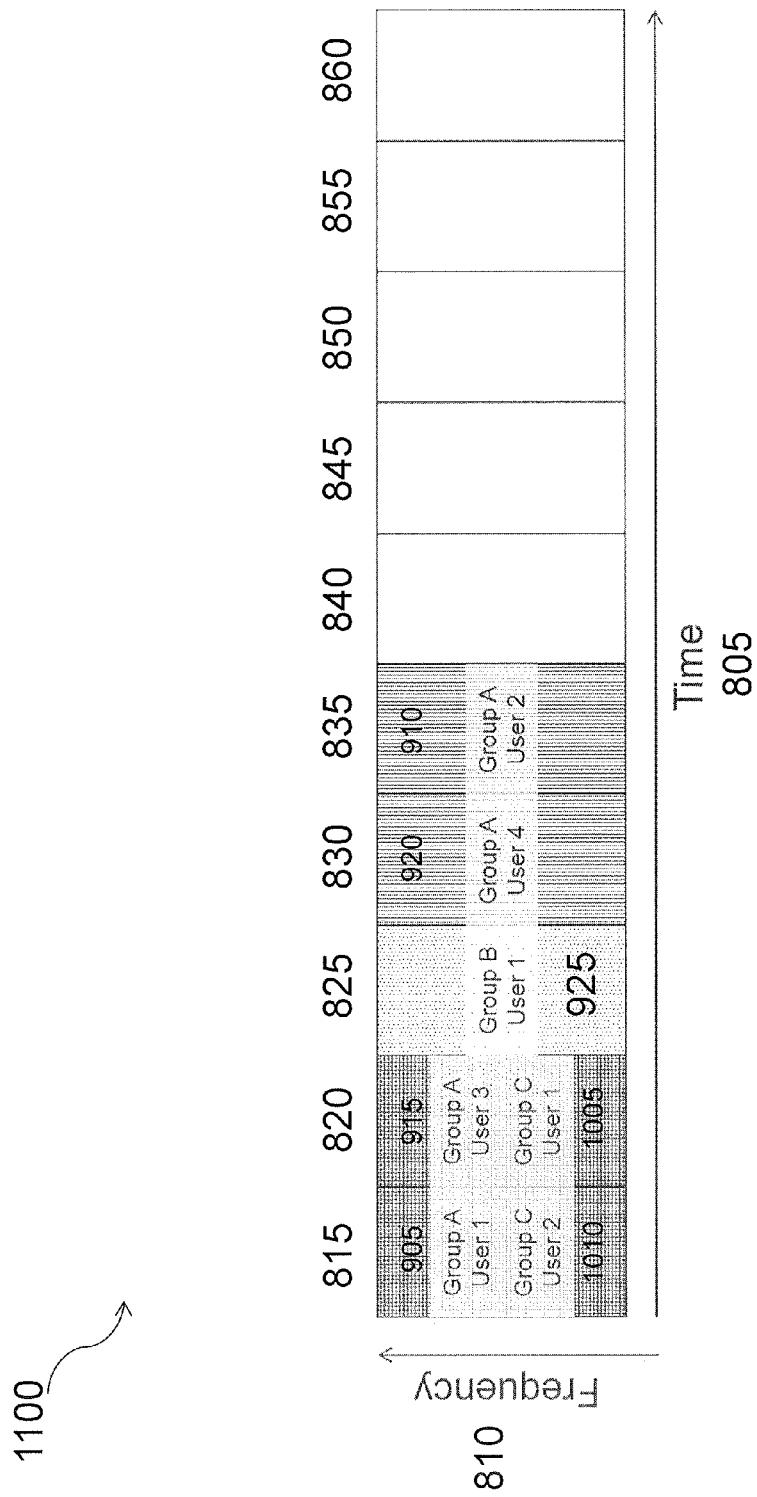
FIG. 11 illustrates the utilization of resources for the scenario described in relation to FIGS. 7-10, in accordance with certain embodiments.

FIG. 11 illustrates the utilization of resources for the scenario described in relation to FIGS. 7-10, in accordance with certain embodiments. More particularly, FIG. 11 illustrates the utilization of radio resources as perceived by the network (i.e., across the whole cell). The resource allocation 1100 corresponds to the superposition of the allocations described above in relation to FIGS. 9 and 10. Note that users from Group A 705 and Group C 715 use overlapping resources. For example, User 1 905 of Group A 705 and User 2 1010 of Group C 715 both use Resource Set 1 815, and User 3 915 of Group A 705 and User 1 1005 of Group C 715 use Resource Set 2 820. Resource Set 3 825, Resource Set 4 830, and Resource Set 5 835 are used as described above in relation to FIGS. 9 and 10. Resource Set 6 840 through Resource Set 10 860 are unused. The unused resource sets may advantageously be reallocated for other types of applications.

The various embodiments described herein can be applied to sharing resources between cellular and other applications, including V2x. The mechanisms for sharing include but are not restricted to TDM, FDM, CDM, and combinations thereof.

Figure 12:
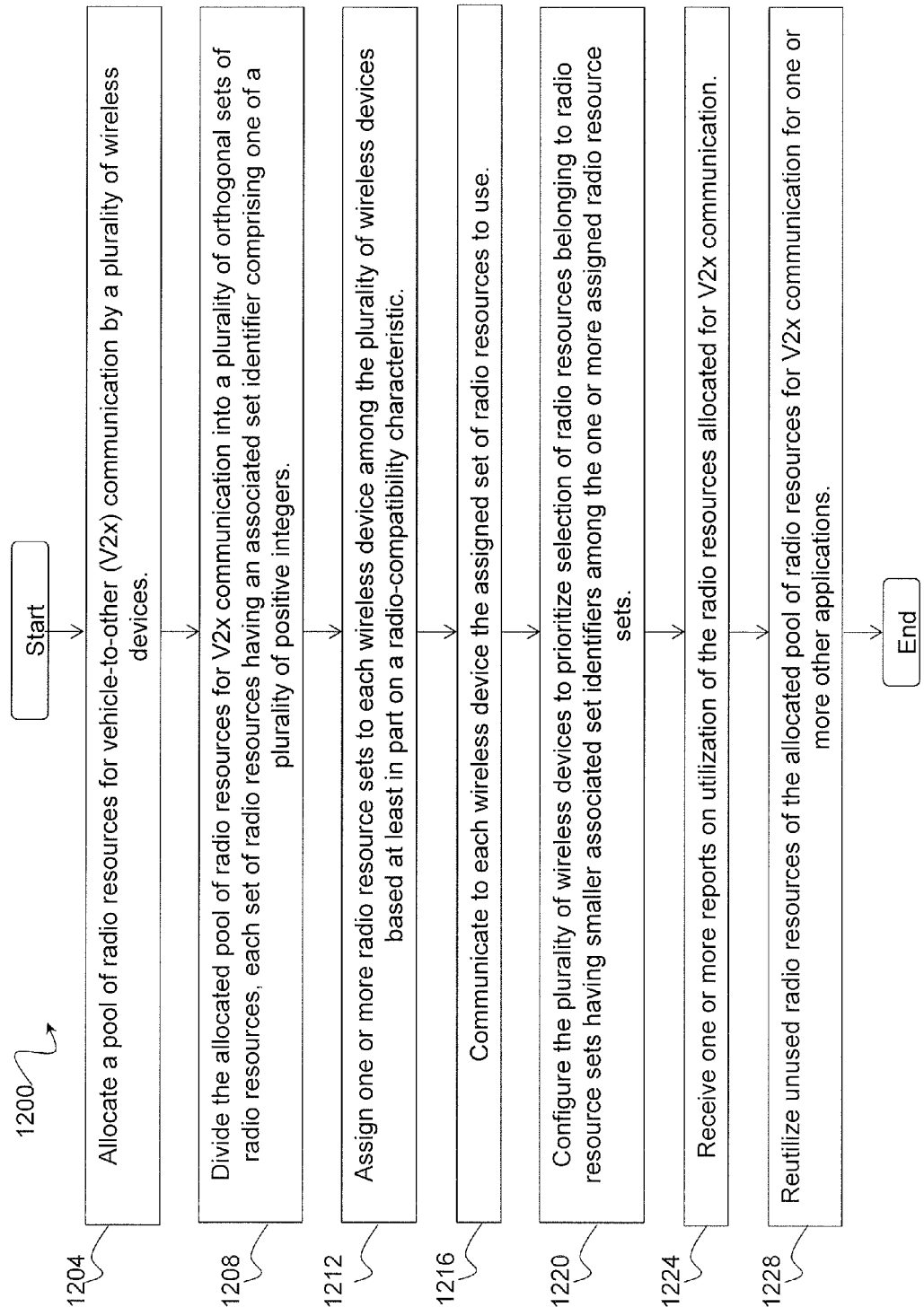
FIG. 12 is a flow chart of a method in a network node, in accordance with an embodiment.

FIG. 12 is a flow chart of a method in a network node, in accordance with an embodiment. The method begins at step 1204, where the network node allocates a pool of radio resources for vehicle-to-other (V2x) communication by a plurality of wireless devices. The network node may allocate the pool of radio resources in any suitable manner. As one example, the network node may allocate the pool of radio resources for V2x communication by allocating a predefined pool of radio resources for V2x communication, the predefined pool of radio resources known to the plurality of wireless devices. As another example, the network node may dynamically allocate a pool of radio resources for V2x communication, and broadcast information about the allocated pool of radio resources for V2x communication to the plurality of wireless devices. As yet another example, the network node may allocate a predefined pool of radio resources known for V2x communication to the plurality of wireless devices, dynamically allocate a pool of radio resources for V2x communication, and broadcast information about the dynamically allocated pool of radio resources for V2x communication to the plurality of wireless devices.

At step 1208, the network node divides the allocated pool of radio resources for V2x communication into a plurality of orthogonal sets of radio resources, each set of radio resources having an associated set identifier comprising one of a plurality of positive integers.

At step 1212, the network node assigns one or more radio resource sets to each wireless device among the plurality of wireless devices based at least in part on a radio-compatibility characteristic. The radio-compatibility characteristic may be any suitable characteristic. For example, the radio compatibility characteristic may be one or more of a distance measurement and a direct radio measurement between wireless devices. In certain embodiments, the plurality of wireless devices may include a first group of wireless devices capable of communicating with each other using V2x communication, and a second group of wireless devices capable of communicating with each other using V2x communication. The first group of wireless devices may be unable to effectively communicate with the second group of wireless devices using V2x communication. In such a scenario, the network node may assign a first resource set to wireless devices in the first group, assign the first resource set to wireless devices in the second group, and assign different resource sets to any other wireless devices that cause interference to wireless devices in the first or second groups. In certain embodiments, the network node may assign the one or more radio resource sets to each wireless device among the plurality of wireless devices based at least in part on one or more radio measurements performed by a wireless device. At step 1216, the network node communicates to each wireless device the assigned set of radio resources to use.

At step 1220, the network node configures the plurality of wireless devices to prioritize selection of radio resources belonging to radio resource sets having smaller associated set identifiers among the one or more assigned radio resource sets. In certain embodiments, each set of radio resources may include a single radio resource, and configuring the plurality of wireless devices to prioritize selection of radio resources belonging to radio resource sets having smaller associated set identifiers among the one or more assigned radio resource sets may comprise configuring the plurality of wireless devices to select a radio resource set having an available radio resource and a set identifier corresponding to the lowest positive integer number among the one or more assigned radio resource sets.

In certain embodiments, each set of radio resources may include multiple radio resources, and configuring the plurality of wireless devices to prioritize selection of radio resources belonging to radio resource sets having smaller associated set identifiers among the one or more assigned radio resource sets may comprise configuring the plurality of wireless devices to select a set of radio resources having available radio resources and a set identifier corresponding to the lowest positive integer number among the one or more assigned radio resource sets, and to select a radio resource from the selected set of radio resources. The radio resource set may be selected from a subset of the plurality of radio resource sets having an associated set identifier smaller than a defined number.

At step 1224, the network node receives one or more reports on utilization of the radio resources allocated for V2x communication. In certain embodiments, the network node may reallocate radio resources based on the one or more received reports on utilization of the radio resources allocated for V2x communication.

At step 1228, the network node reutilizes unused radio resources of the allocated pool of radio resources for V2x communication for one or more other applications.

Figure 13:
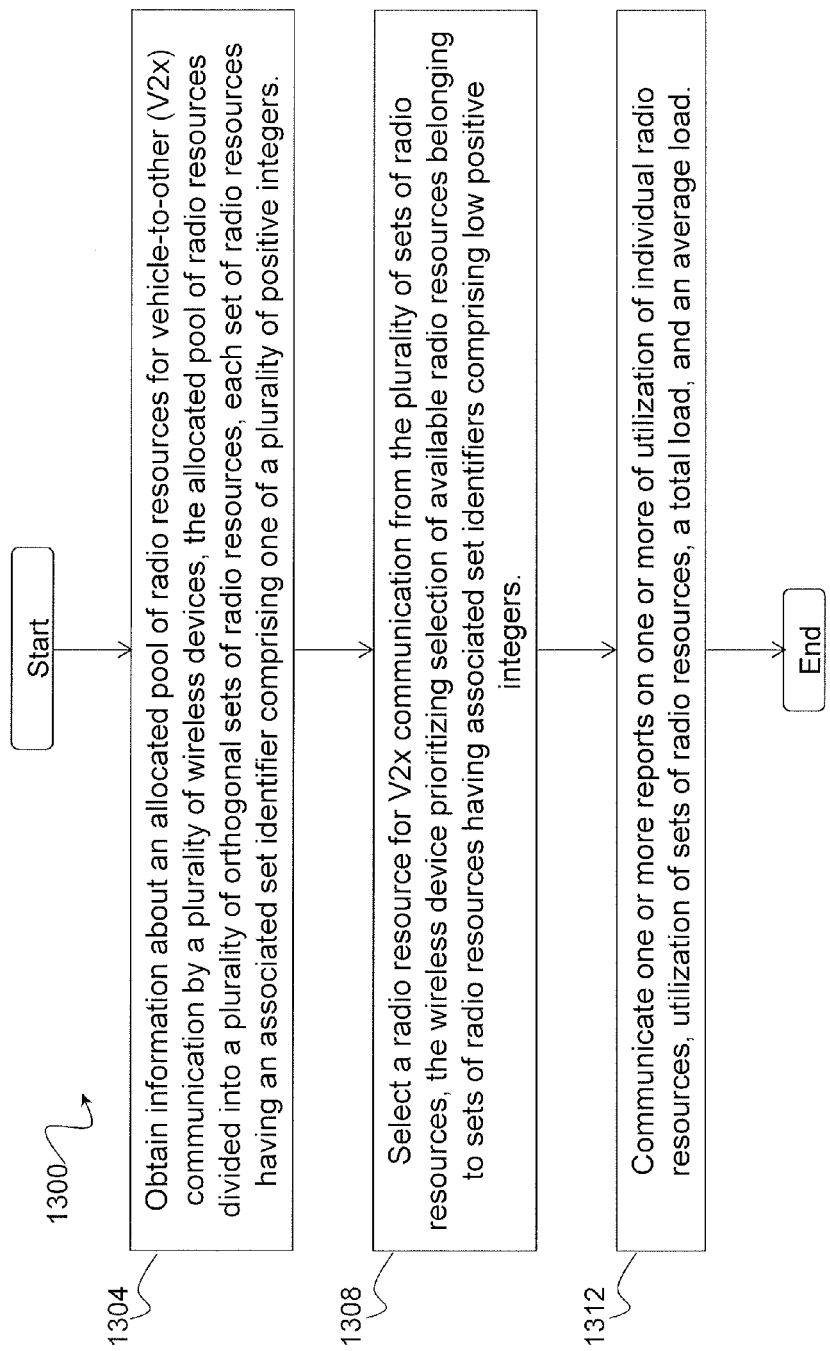
FIG. 13 is a flow chart of a method in a wireless device, in accordance with an embodiment.

FIG. 13 is a flow chart of a method in a wireless device, in accordance with an embodiment. The method begins at step 1304, where the wireless device obtains information about an allocated pool of radio resources for vehicle-to-other (V2x) communication by a plurality of wireless devices, the allocated pool of radio resources divided into a plurality of orthogonal sets of radio resources, each set of radio resources having an associated set identifier comprising one of a plurality of positive integers.

At step 1308, the wireless device selects a radio resource for V2x communication from the plurality of sets of radio resources, the wireless device prioritizing selection of available radio resources belonging to sets of radio resources having associated set identifiers comprising low positive integers. The wireless device may select the radio resource for V2x communication in any suitable manner. As one example, each set of radio resources may include a single radio resource, and selecting a radio resource for V2x communication from the plurality of sets of radio resources may comprise selecting a set of radio resources having an available radio resource and a set identifier corresponding to a lowest positive integer number among the one or more radio resource sets. As another example, each set of radio resources may include multiple radio resources, and selecting a radio resource for V2x communication from the plurality of sets of radio resources may comprise selecting a set of radio resources having available radio resources and a set identifier corresponding to the lowest positive integer number among the one or more radio resource sets, and selecting a radio resource from the selected set of radio resources. In certain embodiments, the radio resource is selected from the plurality of resource sets having available radio resources and a set identifier smaller than a defined number. In certain embodiments, the wireless device may select the radio resource based at least in part on one or more radio measurements performed by the wireless device or another wireless device of the plurality of wireless devices.

At step 1312, the wireless device communicates one or more reports on one or more of utilization of individual radio resources, utilization of sets of radio resources, a total load, and an average load. The one or more reports may include one or both of geographical information and information about which wireless devices of the plurality of wireless devices are using particular radio resources.

Figure 14:
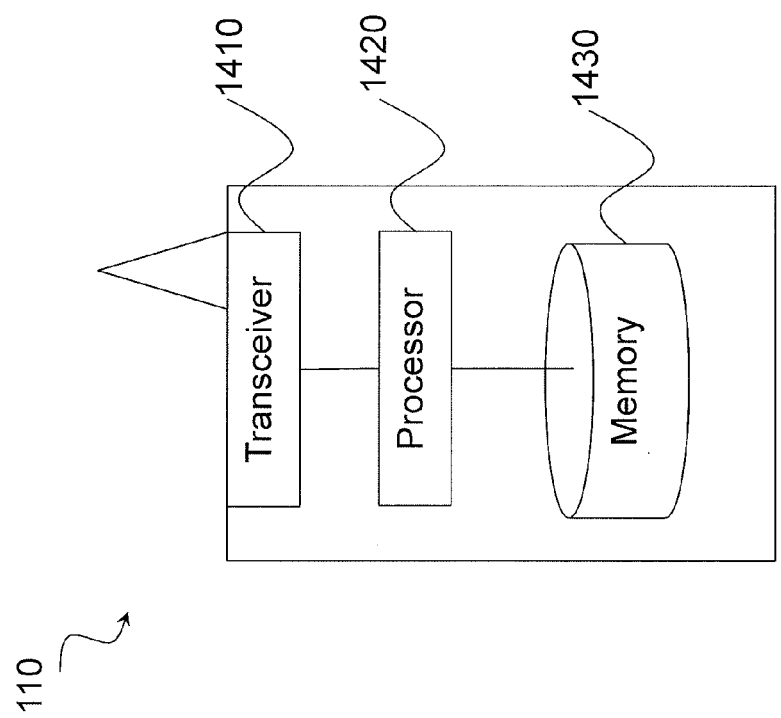
FIG. 14 is a block schematic of an exemplary wireless device, in accordance with certain embodiments.

FIG. 14 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1410, processor 1420, and memory 1430. In some embodiments, transceiver 1410 facilitates transmitting wireless signals to and receiving wireless signals from network node 115 (e.g., via an antenna), processor 1420 executes instructions to provide some or all of the functionality described above as being provided by wireless device 110, and memory 1430 stores the instructions executed by processor 1420.

Processor 1420 may include any suitable combination of hardware and software implemented in one or more modules to execute instructions and manipulate data to perform some or all of the described functions of wireless device 110. In some embodiments, processor 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 14 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may select a radio resource for V2x communication from the plurality of sets of radio resources. As another example, the determining module may prioritize selection of available radio resources belonging to sets of radio resources having associated set identifiers that are low positive integers. The determining module may include or be included in processor 1420. The determining module may include analog and/or digital circuitry configured to perform any of the functions of the determining module and/or processor 1420. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may communicate one or more reports on one or more of utilization of individual radio resources, utilization of sets of radio resources, a total load, an average load, and any other suitable report. The communication module may include a transmitter and/or a transceiver, such as transceiver 1410. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may obtain information about an allocated pool of radio resources for V2x communication. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 15:
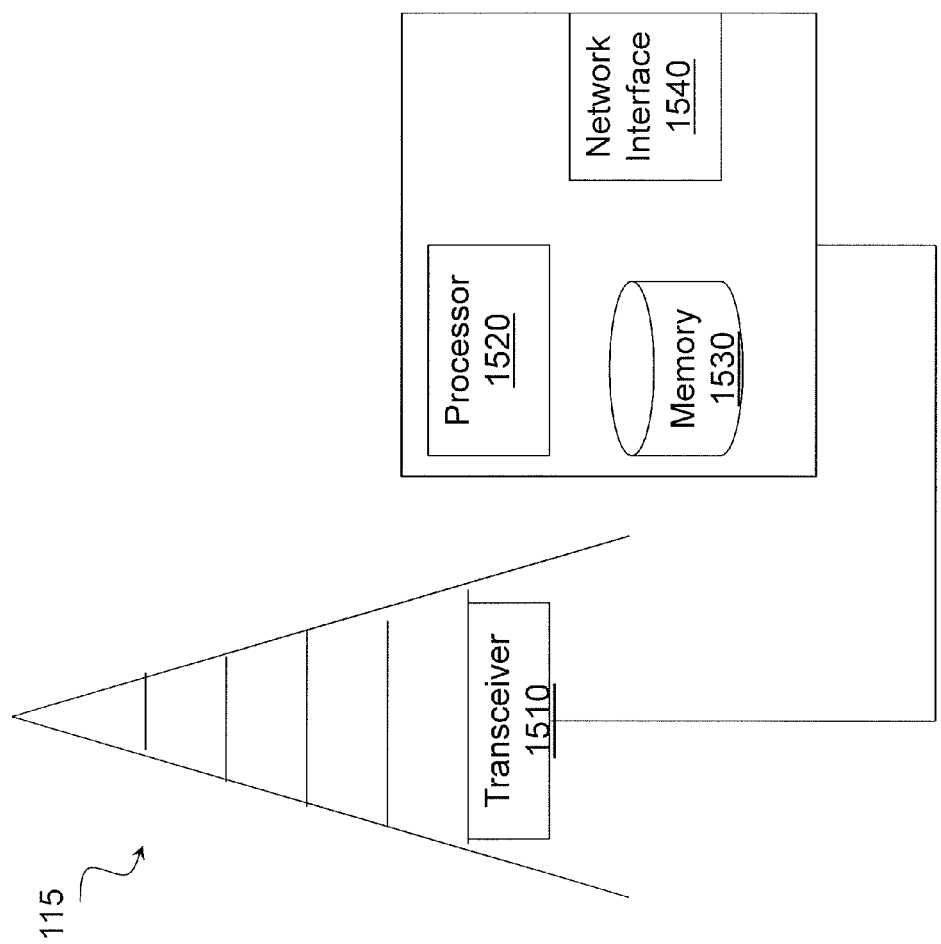
FIG. 15 is a block schematic of an exemplary network node, in accordance with certain embodiments.

FIG. 15 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1510, processor 1520, memory 1530, and network interface 1540. In some embodiments, transceiver 1510 facilitates transmitting wireless signals to and receiving wireless signals from wireless device 110 (e.g., via an antenna), processor 1520 executes instructions to provide some or all of the functionality described above as being provided by a network node 115, memory 1530 stores the instructions executed by processor 1520, and network interface 1540 communicates signals to backend network components, such as a gateway, switch, router, Internet, Public Switched Telephone Network (PSTN), core network nodes, radio network controllers, etc.

Processor 1520 may include any suitable combination of hardware and software implemented in one or more modules to execute instructions and manipulate data to perform some or all of the described functions of network node 115. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for network node 115, send output from network node 115, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1520 of FIG. 15. In certain embodiments, the functions of two or more of the various modules may be combined into a single module.

The determining module may perform the processing functions of network node 115. For example, the determining module may allocate a pool of radio resources for V2x communication by a plurality of wireless devices. As another example, the determining module may divide the allocated pool of radio resources for V2x communication into a plurality of sets of radio resources. As yet another example, the determining module may assign one or more radio resource sets to each wireless device among the plurality of wireless devices. As yet another example, the determining module may configure the plurality of wireless devices to prioritize selection of radio resources belonging to radio resource sets having smaller associated set identifiers among the one or more assigned radio resource sets. As still another example, the determining module may reallocate radio resources based on one or more received reports and/or reutilize unused radio resources of the allocated pool of radio resources for V2x communication for one or more other applications.

The communication module may perform the transmission functions of network node 115. The communication module may transmit messages to one or more of wireless devices 110. For example, the communication module may communicate to each wireless device the assigned set of radio resources to use. As another example, the communication module may broadcast information about the dynamically allocated pool of radio resources for V2x communication to the plurality of wireless devices. The communication module may include a transmitter and/or a transceiver, such as transceiver 1510. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive one or more reports on utilization of the radio resources allocated for V2x communication. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 15 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 16:
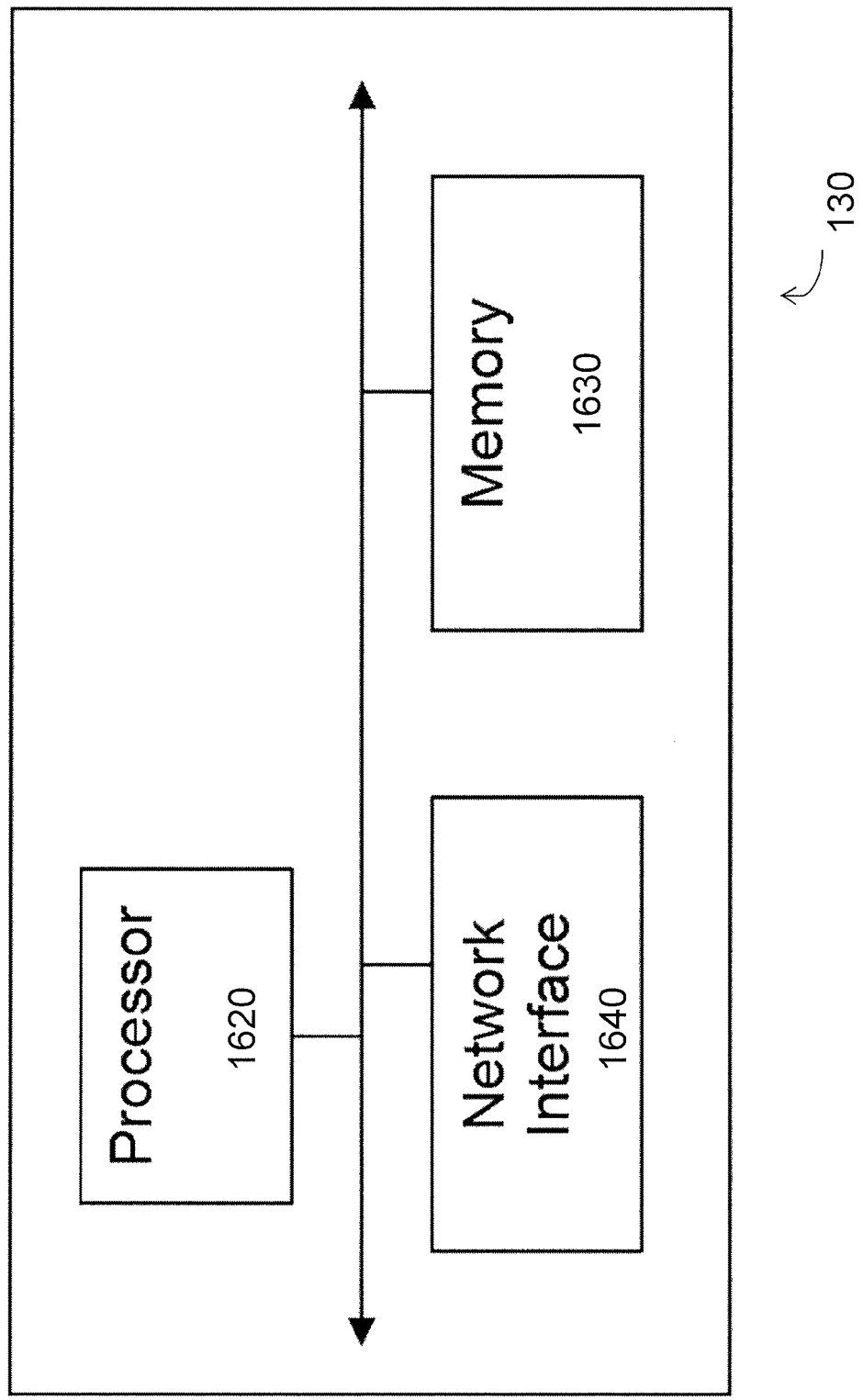
FIG. 16 is a block schematic of an exemplary core network node, in accordance with certain embodiments.

FIG. 16 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1620, memory 1630, and network interface 1640. In some embodiments, processor 1620 executes instructions to provide some or all of the functionality described above as being provided by the network node, memory 1630 stores the instructions executed by processor 1620, and network interface 1640 communicates signals to any suitable node, such as a gateway, switch, router, Internet, Public Switched Telephone Network (PSTN), network nodes 115, radio network controllers and/or core network nodes 130, etc.

Processor 1620 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processor 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BSM Basic Safety Message
CAM Cooperative Awareness Message
CDM Code-Division Multiplexing
D2D Device-to-Device Communication
DENM Decentralized Environmental Notification Message
DSRC Dedicated Short-Range Communications
eNB eNodeB
ETSI European Telecommunications Standards Institute
FDM Frequency-Division Multiplexing
FDMA Frequency-Division Multiple Access
LTE Long-Term Evolution
TDM Time-Division Multiplexing
TDMA Time-Division Multiple Access
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine

The invention claimed is:

1. A method in a network node, comprising:
allocating a pool of radio resources for vehicle-to-other (V2x) communication by a plurality of wireless devices, the plurality of wireless devices comprising:
a first group of wireless devices capable of communicating with each other using V2x communication; and
a second group of wireless devices capable of communicating with each other using V2x communication, the first group of wireless devices unable to effectively communicate with the second group of wireless devices using V2x communication;
dividing the allocated pool of radio resources for V2x communication into a plurality of orthogonal sets of radio resources, each set of radio resources having an associated set identifier comprising one of a plurality of positive integers;
assigning one or more radio resource sets to each wireless device among the plurality of wireless devices based at least in part on a radio-compatibility characteristic, wherein assigning one or more radio resource sets to each wireless device among the plurality comprises:
assigning a first resource set to wireless devices in the first group;
assigning the first resource set to wireless devices in the second group; and
assigning different resource sets to other wireless devices that cause interference to wireless devices in the first or second groups; and
communicating to each wireless device the assigned set of radio resources to use.

2. The method of claim 1, further comprising:
configuring the plurality of wireless devices to prioritize selection of radio resources belonging to radio resource sets having smaller associated set identifiers among the one or more assigned radio resource sets.

3. The method of claim 2, wherein each set of radio resources consists of a single radio resource, and configuring the plurality of wireless devices to prioritize selection of radio resources belonging to radio resource sets having smaller associated set identifiers among the one or more assigned radio resource sets comprises configuring the plurality of wireless devices to select a radio resource set having an available radio resource and a set identifier corresponding to the lowest positive integer number among the one or more assigned radio resource sets.

4. The method of claim 2, wherein each set of radio resources includes multiple radio resources, and configuring the plurality of wireless devices to prioritize selection of radio resources belonging to radio resource sets having smaller associated set identifiers among the one or more assigned radio resource sets comprises:
configuring the plurality of wireless devices to:
select a set of radio resources having available radio resources and a set identifier corresponding to the lowest positive integer number among the one or more assigned radio resource sets; and
select a radio resource from the selected set of radio resources.

5. The method of claim 4, wherein the radio resource set is selected from a subset of the plurality of radio resource sets having an associated set identifier smaller than a defined number.

6. The method of claim 1, wherein assigning one or more radio resource sets to each wireless device among the plurality of wireless devices based at least in part on a radio-compatibility characteristic further comprises assigning one or more radio resource sets to each wireless device among the plurality of wireless devices based at least in part on one or more radio measurements performed by a wireless device.

7. The method of claim 1, wherein allocating the pool of radio resources for V2x communication comprises allocating a predefined pool of radio resources for V2x communication, the predefined pool of radio resources known to the plurality of wireless devices.

8. The method of claim 1, wherein allocating the pool of radio resources for V2x communication comprises dynamically allocating a pool of radio resources for V2x communication, and the method further comprises:
broadcasting information about the allocated pool of radio resources for V2x communication to the plurality of wireless devices.

9. The method of claim 1, wherein allocating the pool of radio resources for V2x communication comprises:

allocating a predefined pool of radio resources known for V2x communication to the plurality of wireless devices;

dynamically allocating a pool of radio resources for V2x communication; and broadcasting information about the dynamically allocated pool of radio resources for V2x communication to the plurality of wireless devices.

10. The method of claim 1, further comprising receiving one or more reports on utilization of the radio resources allocated for V2x communication.

11. The method of claim 10, further comprising reallocating radio resources based on the one or more received reports on utilization of the radio resources allocated for V2x communication.

12. The method of claim 1, further comprising reutilizing unused radio resources of the allocated pool of radio resources for V2x communication for one or more other applications.

13. The method of claim 1, wherein the radio-compatibility characteristic comprises one or more of a distance measurement and a direct radio measurement between wireless devices.

14. A method in a wireless device, comprising:
obtaining information about an allocated pool of radio resources for vehicle-to-other (V2x) communication by a plurality of wireless devices, the allocated pool of radio resources divided into a plurality of orthogonal sets of radio resources, each set of radio resources having an associated set identifier comprising one of a plurality of positive integers, wherein the plurality of wireless devices comprises:
  a first group of wireless devices capable of communicating with each other using V2x communication, wherein the first group of wireless devices is assigned a first plurality of sets of radio resources based at least in part on a radio-compatibility characteristic;
  a second group of wireless devices capable of communicating with each other using V2x communication, wherein the second group of wireless devices is assigned the first plurality of sets of radio resources based at least in part on the radio-compatibility characteristic, and wherein the first group of wireless devices are unable to effectively communicate with the second group of wireless devices using V2x communication; and
  other wireless devices that cause interference to wireless devices in the first or second groups, wherein the other wireless devices are assigned different sets of radio resources from the first plurality of sets of radio resources; and
selecting a radio resource for V2x communication from the plurality of sets of radio resources, the wireless device prioritizing selection of available radio resources belonging to sets of radio resources having associated set identifiers comprising low positive integers.

15. The method of claim 14, wherein each set of radio resources includes a single radio resource, and selecting a radio resource for V2x communication from the plurality of sets of radio resources comprises selecting a set of radio resources having an available radio resource and a set identifier corresponding to a lowest positive integer number among the one or more radio resource sets.

16. The method of claim 14, wherein each set of radio resources includes multiple radio resources, and selecting a radio resource for V2x communication from the plurality of sets of radio resources comprises:
  selecting a set of radio resources having available radio resources and a set identifier corresponding to the lowest positive integer number among the one or more radio resource sets; and
  selecting a radio resource from the selected set of radio resources.

17. The method of claim 14, wherein the radio resource is selected from the plurality of resource sets having available radio resources and a set identifier smaller than a defined number.

18. The method of claim 14, wherein selecting a radio resource from the selected set of radio resources comprises selecting the radio resource based at least in part on one or more radio measurements performed by the wireless device or another wireless device of the plurality of wireless devices.

19. The method of claim 14, further comprising communicating one or more reports on one or more of utilization of individual radio resources, utilization of sets of radio resources, a total load, and an average load.

20. The method of claim 19, wherein the one or more reports further comprise one or both of geographical information and information about which wireless devices of the plurality of wireless devices are using particular radio resources.

21. A network node, comprising:
one or more processors configured to:
allocate a pool of radio resources for vehicle-to-other (V2x) communication by a plurality of wireless devices, the plurality of wireless devices comprising:
  a first group of wireless devices capable of communicating with each other using V2x communication; and
  a second group of wireless devices capable of communicating with each other using V2x communication, the first group of wireless devices unable to effectively communicate with the second group of wireless devices using V2x communication;
divide the allocated pool of radio resources for V2x communication into a plurality of orthogonal sets of radio resources, each set of radio resources having an associated set identifier comprising one of a plurality of positive integers;
assign one or more radio resource sets to each wireless device among the plurality of wireless devices based at least in part on a radio-compatibility characteristic, wherein the one or more processors configured to one or more radio resource sets to each wireless device comprise one or more processors configured to:
  assign a first resource set to wireless devices in the first group;
  assign the first resource set to wireless devices in the second group; and
  assign different resource sets to other wireless devices that cause interference to wireless devices in the first or second groups; and
communicate to each wireless device the assigned set of radio resources to use.

22. The network node of claim 21, wherein the one or more processors are further configured to configure the plurality of wireless devices to prioritize selection of radio resources belonging to radio resource sets having smaller associated set identifiers among the one or more assigned radio resource sets.

23. The network node of claim 22, wherein each set of radio resources consists of a single radio resource, and the one or more processors configured to configure the plurality of wireless devices to prioritize selection of radio resources belonging to radio resource sets having smaller associated set identifiers among the one or more assigned radio resource sets comprise one or more processors configured to configure the plurality of wireless devices to select a radio resource set having an available radio resource and a set identifier corresponding to the lowest positive integer number among the one or more assigned radio resource sets.

24. The network node of claim 22, wherein each set of radio resources includes multiple radio resources, and the one or more processors configured to configure the plurality of wireless devices to prioritize selection of radio resources belonging to radio resource sets having smaller associated set identifiers among the one or more assigned radio resource sets comprise one or more processors configured to:
configure the plurality of wireless devices to:
select a set of radio resources having available radio resources and a set identifier corresponding to the lowest positive integer number among the one or more assigned radio resource sets; and
select a radio resource from the selected set of radio resources.

25. The network node of claim 24, wherein the radio resource set is selected from a subset of the plurality of radio resource sets having an associated set identifier smaller than a defined number.

26. The network node of claim 21, wherein the one or more processors configured to assign one or more radio resource sets to each wireless device among the plurality of wireless devices based at least in part on a radio-compatibility characteristic comprise one or more processors configured to assign one or more radio resource sets to each wireless device among the plurality of wireless devices based at least in part on one or more radio measurements performed by a wireless device.

27. The network node of claim 21, wherein the one or more processors configured to allocate the pool of radio resources for V2x communication comprise one or more processors configured to allocate a predefined pool of radio resources for V2x communication, the predefined pool of radio resources known to the plurality of wireless devices.

28. The network node of claim 21, wherein the one or more processors configured to allocate the pool of radio resources for V2x communication comprise one or more processors configured to dynamically allocate a pool of radio resources for V2x communication, and the one or more processors are further configured to:
broadcast information about the allocated pool of radio resources for V2x communication to the plurality of wireless devices.

29. The network node of claim 21, wherein the one or more processors configured to allocate the pool of radio resources for V2x communication comprise one or more processors configured to:
allocate a predefined pool of radio resources known for V2x communication to the plurality of wireless devices;
dynamically allocate a pool of radio resources for V2x communication; and
broadcast information about the dynamically allocated pool of radio resources for V2x communication to the plurality of wireless devices.

30. The network node of claim 21, wherein the one or more processors are further configured to receive one or more reports on utilization of the radio resources allocated for V2x communication.

31. The network node of claim 30, wherein the one or more processors are further configured to reallocate radio resources based on the one or more received reports on utilization of the radio resources allocated for V2x communication.

32. The network node of claim 21, wherein the one or more processors are further configured to reutilize unused radio resources of the allocated pool of radio resources for V2x communication for one or more other applications.

33. The network node of claim 21, wherein the radio-compatibility characteristic comprises one or more of a distance measurement and a direct radio measurement between wireless devices.

34. A wireless device, comprising:
one or more processors configured to:
obtain information about an allocated pool of radio resources for vehicle-to-other (V2x) communication by a plurality of wireless devices, the allocated pool of radio resources divided into a plurality of orthogonal sets of radio resources, each set of radio resources having an associated set identifier comprising one of a plurality of positive integers, wherein the plurality of wireless devices comprises:
a first group of wireless devices capable of communicating with each other using V2x communication, wherein the first group of wireless devices is assigned a first plurality of sets of radio resources based at least in part on a radio-compatibility characteristic;
a second group of wireless devices capable of communicating with each other using V2x communication, wherein the second group of wireless devices is assigned the first plurality of sets of radio resources based at least in part on the radio-compatibility characteristic, and wherein the first group of wireless devices are unable to effectively communicate with the second group of wireless devices using V2x communication; and
other wireless devices that cause interference to wireless devices in the first or second groups, wherein the other wireless devices are assigned different sets of radio resources from the first plurality of sets of radio resources; and
select a radio resource for V2x communication from the plurality of sets of radio resources, the wireless device prioritizing selection of available radio resources belonging to sets of radio resources having associated set identifiers comprising low positive integers.

35. The wireless device of claim 34, wherein each set of radio resources includes a single radio resource, and the one or more processors configured to select a radio resource for V2x communication from the plurality of sets of radio resources comprise one or more processors configured to select a set of radio resources having an available radio resource and a set identifier corresponding to a lowest positive integer number among the one or more radio resource sets.

36. The wireless device of claim 34, wherein each set of radio resources includes multiple radio resources, and the one or more processors configured to select a radio resource for V2x communication from the plurality of sets of radio resources comprise one or more processors configured to:

select a set of radio resources having available radio resources and a set identifier corresponding to the lowest positive integer number among the one or more radio resource sets; and select a radio resource from the selected set of radio resources.

37. The wireless device of claim 34, wherein the radio resource is selected from the plurality of resource sets having available radio resources and a set identifier smaller than a defined number.

38. The wireless device of claim 34, wherein the one or more processors configured to select a radio resource from the selected set of radio resources comprise one or more processors configured to select the radio resource based at least in part on one or more radio measurements performed by the wireless device or another wireless device of the plurality of wireless devices.

39. The wireless device of claim 34, wherein the one or more processors are further configured to communicate one or more reports on one or more of utilization of individual radio resources, utilization of sets of radio resources, a total load, and an average load.

40. The wireless device of claim 39, wherein the one or more reports further comprise one or both of geographical information and information about which wireless devices of the plurality of wireless devices are using particular radio resources.

* * * * *